US011587150B1

(12) United States Patent
Ross et al.

(10) Patent No.: US 11,587,150 B1
(45) Date of Patent: *Feb. 21, 2023

(54) SYSTEMS AND METHODS FOR ELIGIBILITY VERIFICATION

(71) Applicant: CSIdentity Corporation, Austin, TX (US)

(72) Inventors: Joe Ross, Austin, TX (US); Isaac Chapa, Austin, TX (US); Nayan Patel, Austin, TX (US)

(73) Assignee: CSIDENTITY CORPORATION, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/351,568

(22) Filed: Jun. 18, 2021

Related U.S. Application Data

(63) Continuation of application No. 16/447,763, filed on Jun. 20, 2019, now Pat. No. 11,074,641, which is a (Continued)

(51) Int. Cl.
*G06Q 30/00* (2012.01)
*G06Q 30/0601* (2023.01)
*G06Q 20/40* (2012.01)

(52) U.S. Cl.
CPC ....... *G06Q 30/0637* (2013.01); *G06Q 20/401* (2013.01)

(58) Field of Classification Search
CPC ......................... G06Q 30/0637; G06Q 20/401
(Continued)

(56) References Cited

U.S. PATENT DOCUMENTS 3,752,904 A 8/1973 Waterbury
4,795,890 A 1/1989 Goldman
(Continued)

FOREIGN PATENT DOCUMENTS

AU 2018291152 11/2021
CA 3 076 931 10/2020
(Continued)

OTHER PUBLICATIONS

Cheng, F. (2011). Security attack safe mobile and cloud-based one-time password tokens using rubbing encryption encryption algorithm. Mobile Networks and Applications, 16(3), 304-336. doi:http://dx.doi.org/10.1007/s11036-011-0303-9 (Year: 2011).*
(Continued)

*Primary Examiner* — Michelle T Kringen
*Assistant Examiner* — Arielle E Weiner
(74) *Attorney, Agent, or Firm* — Knobbe Martens Olson & Bear, LLP

(57) ABSTRACT

In one embodiment, a method includes receiving, from a requestor, a request for an on-demand product. The method further includes determining an eligibility token format applicable to the request, wherein the eligibility token format comprises a plurality of partial segments of identifying information. The method also includes prompting the requestor to provide a plurality of partial-segment values corresponding to the plurality of partial segments. In addition, the method includes receiving the plurality of partial-segment values in response to the prompting. Moreover, the method includes generating an eligibility token from the plurality of partial-segment values. The method also includes determining the requestor's eligibility for the on-demand product based, at least in part, on a lookup of the eligibility token in an eligibility token repository. The eli-
(Continued)

gibility token repository includes a plurality of eligibility tokens of the eligibility token format.

20 Claims, 4 Drawing Sheets

Related U.S. Application Data continuation of application No. 14/565,020, filed on Dec. 9, 2014, now Pat. No. 10,373,240.

(60) Provisional application No. 61/984,351, filed on Apr. 25, 2014.

(58) Field of Classification Search
USPC .................................................... 705/26.82
See application file for complete search history.

(56) References Cited

U.S. PATENT DOCUMENTS 4,891,503 A 1/1990 Jewell
4,977,595 A 12/1990 Ohta et al.
4,989,141 A 1/1991 Lyons et al.
5,126,936 A 6/1992 Champion et al.
5,351,293 A 9/1994 Michener et al.
5,590,038 A 12/1996 Pitroda
5,640,577 A 6/1997 Scharmer
5,659,725 A 8/1997 Levy et al.
5,659,731 A 8/1997 Gustafson
5,715,314 A 2/1998 Payne et al.
5,719,941 A 2/1998 Swift et al.
5,748,098 A 5/1998 Grace
5,754,632 A 5/1998 Smith
5,828,840 A 10/1998 Cowan et al.
5,832,068 A 11/1998 Smith
5,844,218 A 12/1998 Kawan et al.
5,866,889 A 2/1999 Weiss et al.
5,881,131 A 3/1999 Farris et al.
5,903,830 A 5/1999 Joao et al.
5,913,196 A 6/1999 Talmor et al.
5,956,693 A 9/1999 Geerlings
5,966,695 A 10/1999 Melchione et al.
5,999,596 A 12/1999 Walker et al.
6,021,397 A 2/2000 Jones et al.
6,021,943 A 2/2000 Chastain
6,026,440 A 2/2000 Shrader et al.
6,038,551 A 3/2000 Barlow et al.
6,055,570 A 4/2000 Nielsen
6,069,941 A 5/2000 Byrd et al.
6,072,894 A 6/2000 Payne
6,073,106 A 6/2000 Rozen et al.
6,073,140 A 6/2000 Morgan et al.
6,085,242 A 7/2000 Chandra
6,119,103 A 9/2000 Basch et al.
6,128,602 A 10/2000 Northington et al.
6,157,707 A 12/2000 Baulier et al.
6,161,139 A 12/2000 Win et al.
6,182,068 B1 1/2001 Culliss
6,182,219 B1 1/2001 Feldbau et al.
6,182,229 B1 1/2001 Nielsen
6,196,460 B1 3/2001 Shin
6,233,588 B1 5/2001 Marchoili et al.
6,247,000 B1 6/2001 Hawkins et al.
6,253,202 B1 6/2001 Gilmour
6,254,000 B1 7/2001 Degen et al.
6,263,447 B1 7/2001 French et al.
6,269,369 B1 7/2001 Robertson
6,282,658 B2 8/2001 French et al.
6,292,795 B1 9/2001 Peters et al.
6,311,169 B2 10/2001 Duhon
6,321,339 B1 11/2001 French et al.
6,327,578 B1 12/2001 Linehan
6,343,279 B1 1/2002 Bissonette et al.
6,356,937 B1 3/2002 Montville et al.
6,397,212 B1 5/2002 Biffar
6,453,353 B1 9/2002 Win et al.
6,457,012 B1 9/2002 Jatkowski
6,463,533 B1 10/2002 Calamera et al.
6,473,740 B2 10/2002 Cockril et al.
6,496,936 B1 12/2002 French et al.
6,510,415 B1 1/2003 Talmor et al.
6,523,021 B1 2/2003 Monberg et al.
6,523,041 B1 2/2003 Morgan et al.
6,539,377 B1 3/2003 Culliss
6,564,210 B1 5/2003 Korda et al.
6,571,334 B1 5/2003 Feldbau et al.
6,574,736 B1 6/2003 Andrews
6,581,059 B1 6/2003 Barrett et al.
6,601,173 B1 7/2003 Mohler
6,607,136 B1 8/2003 Atsmon et al.
6,622,131 B1 9/2003 Brown et al.
6,629,245 B1 9/2003 Stone et al.
6,647,383 B1 11/2003 August et al.
6,654,786 B1 11/2003 Fox et al.
6,658,393 B1 12/2003 Basch et al.
6,679,425 B1 1/2004 Sheppard et al.
6,714,944 B1 3/2004 Shapiro et al.
6,725,381 B1 4/2004 Smith et al.
6,734,886 B1 5/2004 Hagan et al.
6,750,985 B2 6/2004 Rhoads
6,754,665 B1 6/2004 Futagami et al.
6,766,327 B2 7/2004 Morgan, Jr. et al.
6,766,946 B2 7/2004 Iida et al.
6,782,379 B2 8/2004 Lee
6,795,812 B1 9/2004 Lent et al.
6,796,497 B2 9/2004 Benkert et al.
6,804,346 B1 10/2004 Mewhinney
6,805,287 B2 10/2004 Bishop et al.
6,816,850 B2 11/2004 Culliss
6,816,871 B2 11/2004 Lee
6,823,319 B1 11/2004 Lynch et al.
6,829,711 B1 12/2004 Kwok et al.
6,845,448 B1 1/2005 Chaganti et al.
6,857,073 B2 2/2005 French et al.
6,871,287 B1 3/2005 Ellingson
6,892,307 B1 5/2005 Wood et al.
6,900,731 B2 5/2005 Kreiner et al.
6,907,408 B2 6/2005 Angel
6,908,030 B2 6/2005 Rajasekaran et al.
6,910,624 B1 6/2005 Natsuno
6,920,435 B2 7/2005 Hoffman et al.
6,928,487 B2 8/2005 Eggebraaten et al.
6,934,714 B2 8/2005 Meinig
6,934,849 B2 8/2005 Kramer et al.
6,934,858 B2 8/2005 Woodhill
6,947,989 B2 9/2005 Gullotta et al.
6,950,807 B2 9/2005 Brock
6,950,809 B2 9/2005 Dahan et al.
6,950,858 B2 9/2005 Ogami
6,965,881 B1 11/2005 Brickell et al.
6,968,319 B1 11/2005 Remington et al.
6,973,462 B2 12/2005 Dattero et al.
6,983,381 B2 1/2006 Jerdonek
6,985,887 B1 1/2006 Sunstein et al.
6,986,461 B1 1/2006 Geoghegan et al.
6,988,085 B2 1/2006 Hedy
6,993,596 B2 1/2006 Hinton et al.
6,999,941 B1 2/2006 Agarwal
7,016,907 B2 3/2006 Boreham et al.
7,028,013 B2 4/2006 Saeki
7,028,052 B2 4/2006 Chapman et al.
7,039,607 B2 5/2006 Watarai et al.
7,043,476 B2 5/2006 Robson
7,058,817 B1 6/2006 Ellmore
7,059,531 B2 6/2006 Beenau et al.
7,062,475 B1 6/2006 Szabo et al.
7,076,462 B1 7/2006 Nelson et al.
7,085,727 B2 8/2006 VanOrman
7,089,584 B1 8/2006 Sharma
7,107,241 B1 9/2006 Pinto
7,117,172 B1 10/2006 Black
7,121,471 B2 10/2006 Beenau et al.
7,124,144 B2 10/2006 Christianson et al.

(56) References Cited

U.S. PATENT DOCUMENTS 7,154,375 B2 12/2006 Beenau et al.
7,155,739 B2 12/2006 Bari et al.
7,174,454 B2 2/2007 Roskind
7,177,846 B2 2/2007 Moenickheim et al.
7,194,416 B1 3/2007 Provost et al.
7,200,602 B2 4/2007 Jonas
7,203,653 B1 4/2007 McIntosh
7,209,895 B2 4/2007 Kundtz et al.
7,219,107 B2 5/2007 Beringer
7,222,369 B2 5/2007 Vering et al.
7,225,464 B2 5/2007 Satyavolu et al.
7,231,657 B2 6/2007 Honarvar et al.
7,234,156 B2 6/2007 French et al.
7,234,160 B2 6/2007 Vogel et al.
7,237,267 B2 6/2007 Rayes et al.
7,240,199 B2 7/2007 Tomkow
7,240,363 B1 7/2007 Ellingson
7,243,369 B2 7/2007 Bhat et al.
7,246,067 B2 7/2007 Austin et al.
7,246,740 B2 7/2007 Swift et al.
7,249,096 B1 7/2007 Lasater et al.
7,249,113 B1 7/2007 Continelli et al.
7,251,347 B2 7/2007 Smith
7,263,497 B1 8/2007 Wiser et al.
7,289,971 B1 10/2007 O'Neil et al.
7,303,120 B2 12/2007 Beenau et al.
7,310,611 B2 12/2007 Shibuya et al.
7,314,167 B1 1/2008 Kiliccote
7,328,233 B2 2/2008 Salim et al.
7,330,871 B2 2/2008 Barber
7,333,635 B2 2/2008 Tsantes et al.
7,337,468 B2 2/2008 Metzger
7,340,042 B2 3/2008 Cluff et al.
7,340,679 B2 3/2008 Botscheck et al.
7,343,149 B2 3/2008 Benco
7,343,295 B2 3/2008 Pomerance
7,356,503 B1 4/2008 Johnson et al.
7,356,506 B2 4/2008 Watson et al.
7,356,516 B2 4/2008 Richey et al.
7,370,044 B2 5/2008 Mulhern et al.
7,370,351 B1 5/2008 Ramachandran et al.
7,383,988 B2 6/2008 Slonecker, Jr.
7,386,448 B1 6/2008 Poss et al.
7,389,913 B2 6/2008 Starrs
7,403,942 B1 7/2008 Bayliss
7,421,732 B2 9/2008 Costa-Requena et al.
7,433,864 B2 10/2008 Malik
7,437,679 B2 10/2008 Uemura et al.
7,438,226 B2 10/2008 Helsper et al.
7,444,414 B2 10/2008 Foster et al.
7,444,518 B1 10/2008 Dharmarajan et al.
7,451,113 B1 11/2008 Kasower
7,458,508 B1 12/2008 Shao et al.
7,460,857 B2 12/2008 Roach, Jr.
7,467,401 B2 12/2008 Cicchitto
7,478,157 B2 1/2009 Bohrer et al.
7,480,631 B1 1/2009 Merced et al.
7,490,356 B2 2/2009 Lieblich et al.
7,503,489 B2 3/2009 Heffez
7,509,117 B2 3/2009 Yum
7,509,278 B2 3/2009 Jones
7,512,221 B2 3/2009 Toms
7,519,558 B2 4/2009 Ballard et al.
7,526,796 B2 4/2009 Lulich et al.
7,529,698 B2 5/2009 Joao
7,530,097 B2 5/2009 Casco-Arias et al.
7,542,993 B2 6/2009 Satterfield et al.
7,543,739 B2 6/2009 Brown et al.
7,546,271 B1 6/2009 Chmielewski et al.
7,548,886 B2 6/2009 Kirkland et al.
7,552,080 B1 6/2009 Willard et al.
7,552,123 B2 6/2009 Wade et al.
7,552,467 B2 6/2009 Lindsay
7,555,459 B2 6/2009 Dhar et al.
7,562,184 B2 7/2009 Henmi et al.
7,562,814 B1 7/2009 Shao et al.
7,566,002 B2 7/2009 Love et al.
7,571,473 B1 8/2009 Boydstun et al.
7,575,157 B2 8/2009 Barnhardt et al.
7,577,665 B2 8/2009 Ramer et al.
7,577,934 B2 8/2009 Anonsen et al.
7,580,884 B2 8/2009 Cook
7,581,112 B2 8/2009 Brown et al.
7,584,126 B1 9/2009 White
7,584,146 B1 9/2009 Duhon
7,587,366 B2 9/2009 Grim, III et al.
7,587,368 B2 9/2009 Felsher
7,603,701 B2 10/2009 Gaucas
7,606,401 B2 10/2009 Hoffman et al.
7,606,725 B2 10/2009 Robertson et al.
7,610,216 B1 10/2009 May et al.
7,613,600 B2 11/2009 Krane
7,620,596 B2 11/2009 Knudson et al.
7,623,844 B2 11/2009 Herrmann et al.
7,630,932 B2 12/2009 Danaher et al.
7,634,737 B2 12/2009 Beringer et al.
7,636,941 B2 12/2009 Blinn et al.
7,641,113 B1 1/2010 Alvarez et al.
7,647,344 B2 1/2010 Skurtovich, Jr. et al.
7,653,592 B1 1/2010 Flaxman et al.
7,653,600 B2 1/2010 Gustin
7,653,688 B2 1/2010 Bittner
7,657,431 B2 2/2010 Hayakawa
7,660,989 B2 2/2010 Tomkow
7,672,833 B2 3/2010 Blume et al.
7,676,834 B2 3/2010 Camaisa et al.
7,685,096 B2 3/2010 Margolus et al.
7,685,209 B1 3/2010 Norton et al.
7,685,279 B2 3/2010 Miltonberger et al.
7,686,214 B1 3/2010 Shao et al.
7,689,487 B1 3/2010 Britto et al.
7,689,505 B2 3/2010 Kasower
7,689,563 B1 3/2010 Jacobson
7,690,032 B1 3/2010 Peirce
7,698,214 B1 4/2010 Lindgren
7,698,217 B1 4/2010 Phillips et al.
7,698,445 B2 4/2010 Fitzpatrick et al.
7,698,558 B2 4/2010 Tomkow
7,707,271 B2 4/2010 Rudkin et al.
7,707,624 B2 4/2010 Tomkow
7,708,190 B2 5/2010 Brandt et al.
7,711,635 B2 5/2010 Steele et al.
7,725,385 B2 5/2010 Royer et al.
7,730,078 B2 6/2010 Schwabe et al.
7,739,139 B2 6/2010 Robertson et al.
7,747,494 B1 6/2010 Kothari et al.
7,747,520 B2 6/2010 Livermore et al.
7,747,521 B2 6/2010 Serio
7,747,542 B2 6/2010 Morley et al.
7,761,384 B2 7/2010 Madhogarhia
7,761,568 B1 7/2010 Levi et al.
7,765,166 B2 7/2010 Beringer et al.
7,765,311 B2 7/2010 Itabashi et al.
7,769,696 B2 8/2010 Yoda
7,769,697 B2 8/2010 Fieschi et al.
7,769,998 B2 8/2010 Lynch et al.
7,774,270 B1 8/2010 MacCloskey
7,788,040 B2 8/2010 Haskell et al.
7,792,715 B1 9/2010 Kasower
7,792,725 B2 9/2010 Booraem et al.
7,793,835 B1 9/2010 Coggeshall et al.
7,797,725 B2 9/2010 Lunt et al.
7,801,828 B2 9/2010 Candella et al.
7,801,956 B1 9/2010 Cumberbatch et al.
7,802,104 B2 9/2010 Dickinson
7,810,036 B2 10/2010 Bales et al.
7,818,228 B1 10/2010 Coulter
7,827,115 B2 11/2010 Weller et al.
7,841,004 B1 11/2010 Balducci et al.
7,841,008 B1 11/2010 Cole et al.
7,844,520 B1 11/2010 Franklin
7,849,014 B2 12/2010 Erikson
7,849,624 B2 12/2010 Holt et al.
7,853,493 B2 12/2010 DeBie et al.

(56) References Cited

U.S. PATENT DOCUMENTS 7,853,533 B2 12/2010 Eisen
7,853,984 B2 12/2010 Antell et al.
7,865,557 B2 1/2011 Tomkow
7,865,958 B2 1/2011 Lieblich et al.
7,870,078 B2 1/2011 Clark et al.
7,877,304 B1 1/2011 Coulter
7,877,784 B2 1/2011 Chow et al.
7,880,728 B2 2/2011 de los Reyes et al.
7,886,008 B2 2/2011 Tomkow et al.
7,908,242 B1 3/2011 Achanta
7,909,246 B2 3/2011 Hogg et al.
7,912,865 B2 3/2011 Akerman et al.
7,930,285 B2 4/2011 Abraham et al.
7,930,411 B1 4/2011 Hayward
7,941,324 B1 5/2011 Sholtis
7,958,046 B2 6/2011 Doerner et al.
7,966,192 B2 6/2011 Pagliari et al.
7,966,372 B1 6/2011 Tomkow
7,970,679 B2 6/2011 Kasower
7,975,299 B1 7/2011 Balducci et al.
7,979,908 B2 7/2011 Millwee
7,983,932 B2 7/2011 Kane
7,983,979 B2 7/2011 Holland, IV
7,991,688 B2 8/2011 Phelan et al.
8,001,153 B2 8/2011 Skurtovich, Jr. et al.
8,001,235 B2 8/2011 Russ et al.
8,005,155 B1 8/2011 Lee et al.
8,011,582 B2 9/2011 Ghafarzadeh
8,032,932 B2 10/2011 Speyer et al.
8,037,097 B2 10/2011 Guo et al.
8,041,956 B1 10/2011 White et al.
8,055,904 B1 11/2011 Cato et al.
8,060,424 B2 11/2011 Kasower
8,060,916 B2 11/2011 Bajaj et al.
8,065,233 B2 11/2011 Lee et al.
8,073,785 B1 12/2011 Candella et al.
8,078,453 B2 12/2011 Shaw
8,078,524 B2 12/2011 Crawford et al.
8,078,881 B1 12/2011 Liu
8,079,070 B2 12/2011 Camaisa et al.
8,099,341 B2 1/2012 Varghese
8,104,679 B2 1/2012 Brown
8,116,731 B2 2/2012 Buhrmann et al.
8,116,751 B2 2/2012 Aaron
8,127,982 B1 3/2012 Casey et al.
8,127,986 B1 3/2012 Taylor et al.
8,131,777 B2 3/2012 McCullouch
8,144,368 B2 3/2012 Rodriguez et al.
8,151,327 B2 4/2012 Eisen
8,161,104 B2 4/2012 Tomkow
8,172,132 B2 5/2012 Love et al.
8,175,889 B1 5/2012 Girulat et al.
8,185,747 B2 5/2012 Wood et al.
8,190,513 B2 5/2012 Felger
8,195,549 B2 6/2012 Kasower
8,209,389 B2 6/2012 Tomkow
8,219,771 B2 7/2012 Le Neel
8,219,822 B2 7/2012 Camaisa et al.
8,224,723 B2 7/2012 Bosch et al.
8,224,913 B2 7/2012 Tomkow
8,225,395 B2 7/2012 Atwood et al.
8,229,810 B2 7/2012 Butera et al.
8,229,844 B2 7/2012 Felger
8,234,498 B2 7/2012 Britti et al.
8,239,677 B2 8/2012 Colson
8,239,929 B2 8/2012 Kwan et al.
8,241,369 B2 8/2012 Stevens
8,244,629 B2 8/2012 Lewis et al.
8,244,848 B1 8/2012 Narayanan et al.
8,255,452 B2 8/2012 Piliouras
8,255,971 B1 8/2012 Webb et al.
8,255,978 B2 8/2012 Dick
8,260,706 B2 9/2012 Freishtat et al.
8,261,334 B2 9/2012 Hazlehurst et al.
8,266,065 B2 9/2012 Dilip et al.
8,275,845 B2 9/2012 Tomkow
8,280,348 B2 10/2012 Snyder et al.
8,281,372 B1 10/2012 Vidal
8,285,613 B1 10/2012 Coulter
8,285,656 B1 10/2012 Chang et al.
8,291,218 B2 10/2012 Garcia et al.
8,291,477 B2 10/2012 Lunt
8,295,898 B2 10/2012 Ashfield et al.
8,296,562 B2 10/2012 Williams et al.
8,302,164 B2 10/2012 Lunt
8,312,033 B1 11/2012 McMillan
8,315,940 B2 11/2012 Winbom et al.
8,327,429 B2 12/2012 Speyer et al.
8,359,278 B2 1/2013 Domenikos et al.
8,359,393 B2 1/2013 Metzger
8,374,634 B2 2/2013 Dankar et al.
8,374,973 B2 2/2013 Herbrich et al.
8,406,736 B2 3/2013 Das et al.
8,423,648 B2 4/2013 Ferguson et al.
8,442,886 B1 5/2013 Haggerty et al.
8,442,910 B2 5/2013 Morris et al.
8,443,202 B2 5/2013 White et al.
8,447,016 B1 5/2013 Kugler et al.
8,456,293 B1 6/2013 Trundle et al.
8,464,939 B1 6/2013 Taylor et al.
8,468,090 B2 6/2013 Lesandro et al.
8,468,198 B2 6/2013 Tomkow
8,468,199 B2 6/2013 Tomkow
8,478,674 B1 7/2013 Kapczynski et al.
8,478,981 B2 7/2013 Khan et al.
8,484,186 B1 7/2013 Kapczynski et al.
8,484,706 B2 7/2013 Tomkow
8,504,628 B2 8/2013 Tomkow
8,515,828 B1 8/2013 Wolf et al.
8,515,844 B2 8/2013 Kasower
8,527,357 B1 9/2013 Ganesan
8,527,417 B2 9/2013 Telle et al.
8,527,773 B1 9/2013 Metzger
8,528,078 B2 9/2013 Camaisa et al.
8,533,118 B2 9/2013 Weller et al.
8,533,791 B2 9/2013 Samuelsson et al.
8,549,590 B1 10/2013 de Villiers Prichard et al.
8,560,381 B2 10/2013 Green et al.
8,572,391 B2 10/2013 Golan et al.
8,578,496 B1 11/2013 Krishnappa
8,588,748 B2 11/2013 Buhrman et al.
8,600,886 B2 12/2013 Ramavarjula et al.
8,601,602 B1 12/2013 Zheng
8,606,234 B2 12/2013 Pei et al.
8,606,694 B2 12/2013 Campbell et al.
8,620,942 B1 12/2013 Hoffman et al.
8,630,938 B2 1/2014 Cheng et al.
8,645,275 B2 2/2014 Seifert et al.
8,646,051 B2 2/2014 Paden et al.
8,656,504 B2 2/2014 Lurey et al.
8,671,115 B2 3/2014 Skurtovich, Jr. et al.
8,688,543 B2 4/2014 Dominquez
8,689,311 B2 4/2014 Blinn et al.
8,695,105 B2 4/2014 Mahendrakar et al.
8,701,199 B1 4/2014 Dotan et al.
8,705,718 B2 4/2014 Baniak et al.
8,706,599 B1 4/2014 Koenig et al.
8,725,613 B1 5/2014 Celka et al.
8,738,934 B2 5/2014 Lurey et al.
8,744,956 B1 6/2014 DiChiara et al.
8,751,388 B1 6/2014 Chapa
8,762,287 B2 6/2014 Morley et al.
8,768,914 B2 7/2014 Scriffignano et al.
8,769,614 B1 7/2014 Knox et al.
8,781,882 B1 7/2014 Arboletti et al.
8,781,953 B2 7/2014 Kasower
8,781,975 B2 7/2014 Bennett et al.
8,782,154 B2 7/2014 Tomkow
8,782,217 B1 7/2014 Arone et al.
8,782,753 B2 7/2014 Lunt
8,793,166 B2 7/2014 Mizhen
8,793,509 B1 7/2014 Nelson et al.
8,793,777 B2 7/2014 Colson
8,800,005 B2 8/2014 Lunt

(56) References Cited

U.S. PATENT DOCUMENTS 8,806,584 B2 8/2014 Lunt
8,818,888 B1 8/2014 Kapczynski et al.
8,819,793 B2 8/2014 Gottschalk, Jr.
8,826,371 B2 9/2014 Webb et al.
8,826,393 B2 9/2014 Eisen
8,831,564 B2 9/2014 Ferguson et al.
8,839,394 B2 9/2014 Dennis et al.
8,856,894 B1 10/2014 Dean et al.
8,862,514 B2 10/2014 Eisen
8,868,932 B2 10/2014 Lurey et al.
D717,332 S 11/2014 Nies et al.
8,931,058 B2 1/2015 DiChiara et al.
8,938,399 B1 1/2015 Herman
8,954,459 B1 2/2015 McMillan et al.
8,972,400 B1 3/2015 Kapczynski et al.
9,010,627 B1 4/2015 Prasad et al.
9,043,886 B2 5/2015 Srinivasan et al.
9,047,473 B2 6/2015 Samuelsson et al.
9,100,400 B2 8/2015 Lunt
9,106,691 B1 8/2015 Burger et al.
9,124,606 B2 9/2015 Metzger
9,147,042 B1 9/2015 Haller et al.
9,147,117 B1 9/2015 Madhu et al.
9,154,482 B2 10/2015 Dudziak et al.
9,158,903 B2 10/2015 Metzger
9,185,123 B2 11/2015 Dennis et al.
9,195,984 B1 11/2015 Spector et al.
9,195,985 B2 11/2015 Domenica et al.
9,196,004 B2 11/2015 Eisen
9,203,819 B2 12/2015 Fenton et al.
9,215,223 B2 12/2015 Kirsch
9,235,728 B2 1/2016 Gottschalk, Jr. et al.
9,246,899 B1 1/2016 Durney et al.
9,256,624 B2 2/2016 Skurtovich, Jr. et al.
9,269,085 B2 2/2016 Webb et al.
9,294,476 B1 3/2016 Lurey et al.
9,344,413 B2 5/2016 Kirsch
9,361,597 B2 6/2016 Britton et al.
9,380,057 B2 6/2016 Knauss
9,390,384 B2 7/2016 Eisen
9,391,971 B2 7/2016 Lunt
9,412,141 B2 8/2016 Prichard et al.
9,420,448 B2 8/2016 Dankar et al.
9,462,044 B1 10/2016 Preibisch et al.
9,465,786 B2 10/2016 Lurey et al.
9,467,445 B2 10/2016 Egan et al.
9,491,160 B2 11/2016 Livesay et al.
9,578,014 B2 2/2017 Sondhi et al.
9,600,651 B1 3/2017 Ryan et al.
9,607,336 B1 3/2017 Dean et al.
9,626,680 B1 4/2017 Ryan et al.
9,633,322 B1 4/2017 Burger
9,641,521 B2 5/2017 Egan et al.
9,665,854 B1 5/2017 Burger et al.
9,684,905 B1 6/2017 Haller et al.
9,697,521 B2 7/2017 Webb et al.
9,706,402 B2 7/2017 Kueh
9,710,523 B2 7/2017 Skurtovich, Jr. et al.
9,721,147 B1 8/2017 Kapczynski
9,734,501 B2 8/2017 Durney et al.
9,754,256 B2 9/2017 Britton et al.
9,754,311 B2 9/2017 Eisen
9,760,885 B1 9/2017 Ramalingam et al.
9,779,392 B1 10/2017 Prasad et al.
9,818,121 B2 11/2017 Snyder et al.
9,843,582 B2 12/2017 Mahendrakar et al.
9,876,796 B2 1/2018 Egan et al.
9,892,389 B2 2/2018 Domenica et al.
10,075,446 B2 9/2018 McMillan et al.
10,089,679 B2 10/2018 Eisen
10,097,551 B2 10/2018 Chan et al.
10,115,079 B1 10/2018 Burger et al.
10,169,761 B1 1/2019 Burger
10,284,548 B2 5/2019 Williams et al.
10,356,079 B2 7/2019 Lurey et al.
10,373,240 B1 8/2019 Ross et al.
10,380,565 B1 8/2019 Prasad
10,395,053 B2 8/2019 Samid
10,438,308 B2 10/2019 Prichard et al.
10,453,159 B2 10/2019 Kapczynski
10,616,196 B1 4/2020 Khitrenovich et al.
10,637,646 B2 4/2020 Krishnamacharya et al.
10,652,227 B2 5/2020 Spektor et al.
10,664,936 B2 5/2020 Chapa et al.
10,685,336 B1 6/2020 Burger et al.
10,719,873 B1 7/2020 Dean et al.
10,740,762 B2 8/2020 Burger
10,771,463 B2 9/2020 Berezin et al.
10,783,542 B2 9/2020 Walz et al.
10,798,093 B2 10/2020 Kaliski, Jr. et al.
10,798,096 B2 10/2020 Touati et al.
10,863,359 B2 12/2020 Talwar
10,891,618 B2 1/2021 Kinch et al.
10,911,234 B2 2/2021 Jain et al.
10,999,298 B2 5/2021 Eisen
11,012,240 B1 5/2021 Kirsch
11,074,641 B1 7/2021 Ross et al.
11,120,519 B2 9/2021 Kapczynski
11,146,676 B2 10/2021 Sena, Jr. et al.
11,157,872 B2 10/2021 McMillan et al.
11,164,178 B2 11/2021 Anderson et al.
11,164,271 B2 11/2021 Chapa et al.
11,178,128 B2 11/2021 Poschel et al.
11,206,246 B2 12/2021 Krishnamacharya
11,232,413 B1 1/2022 Burger et al.
11,277,439 B2 3/2022 Knopf
11,288,677 B1 3/2022 Burger
11,290,255 B2 3/2022 Krishnamacharya et al.
11,356,460 B2 6/2022 Bondugula et al.
11,361,317 B2 6/2022 Billman et al.
2001/0029482 A1 10/2001 Tealdi et al.
2001/0039532 A1 11/2001 Coleman, Jr. et al.
2001/0042785 A1 11/2001 Walker et al.
2001/0044729 A1 11/2001 Pomerance
2001/0044756 A1 11/2001 Watkins et al.
2001/0049274 A1 12/2001 Degraeve
2002/0004736 A1 1/2002 Roundtree et al.
2002/0013827 A1 1/2002 Edstrom et al.
2002/0013899 A1 1/2002 Faul
2002/0026519 A1 2/2002 Itabashi et al.
2002/0032635 A1 3/2002 Harris et al.
2002/0033846 A1 3/2002 Balasubramanian et al.
2002/0045154 A1 4/2002 Wood et al.
2002/0052754 A1 5/2002 Joyce et al.
2002/0059201 A1 5/2002 Work
2002/0059521 A1 5/2002 Tasler
2002/0069122 A1 6/2002 Yun et al.
2002/0077964 A1 6/2002 Brody et al.
2002/0087460 A1 7/2002 Hornung
2002/0091544 A1 7/2002 Middeljans et al.
2002/0091635 A1 7/2002 Dilip et al.
2002/0099635 A1 7/2002 Guiragosian
2002/0103933 A1 8/2002 Garon et al.
2002/0111816 A1 8/2002 Lortscher et al.
2002/0116247 A1 8/2002 Tucker et al.
2002/0120537 A1 8/2002 Morea et al.
2002/0120757 A1 8/2002 Sutherland et al.
2002/0120846 A1 8/2002 Stewart et al.
2002/0128962 A1 9/2002 Kasower
2002/0133365 A1 9/2002 Grey et al.
2002/0133462 A1 9/2002 Shteyn
2002/0138470 A1 9/2002 Zhou
2002/0143943 A1 10/2002 Lee et al.
2002/0147801 A1 10/2002 Gullotta et al.
2002/0157029 A1 10/2002 French et al.
2002/0169747 A1 11/2002 Chapman et al.
2002/0173994 A1 11/2002 Ferguson, III
2002/0174048 A1 11/2002 Dheer et al.
2002/0184509 A1 12/2002 Scheidt et al.
2002/0198800 A1 12/2002 Shamrakov
2002/0198806 A1 12/2002 Blagg et al.
2002/0198824 A1 12/2002 Cook
2002/0198830 A1 12/2002 Randell et al.
2003/0002671 A1 1/2003 Inchalik et al.

(56) References Cited

U.S. PATENT DOCUMENTS

2003/0009418 A1 1/2003 Green et al.
2003/0009426 A1 1/2003 Ruiz-Sanchez
2003/0023531 A1 1/2003 Fergusson
2003/0036995 A1 2/2003 Lazerson
2003/0041031 A1 2/2003 Hedy
2003/0046311 A1 3/2003 Baidya et al.
2003/0046554 A1 3/2003 Leydier et al.
2003/0048904 A1 3/2003 Wang et al.
2003/0061163 A1 3/2003 Durfield
2003/0069839 A1 4/2003 Whittington et al.
2003/0069943 A1 4/2003 Bahrs et al.
2003/0097342 A1 5/2003 Whittingtom
2003/0097380 A1 5/2003 Mulhern et al.
2003/0105710 A1 6/2003 Barbara et al.
2003/0105733 A1 6/2003 Boreham
2003/0105742 A1 6/2003 Boreham et al.
2003/0115133 A1 6/2003 Bian
2003/0131102 A1 7/2003 Umbreit
2003/0154162 A1 8/2003 Danaher et al.
2003/0158960 A1 8/2003 Engberg
2003/0163513 A1 8/2003 Schaeck et al.
2003/0163733 A1 8/2003 Barriga-Caceres et al.
2003/0171942 A1 9/2003 Gaito
2003/0177028 A1 9/2003 Cooper et al.
2003/0182214 A1 9/2003 Taylor
2003/0187837 A1 10/2003 Culliss
2003/0188193 A1 10/2003 Venkataramappa
2003/0195859 A1 10/2003 Lawrence
2003/0200447 A1 10/2003 Sjoblom
2003/0204429 A1 10/2003 Botscheck et al.
2003/0204752 A1 10/2003 Garrison
2003/0208412 A1 11/2003 Hillestad et al.
2003/0220858 A1 11/2003 Lam et al.
2004/0002878 A1 1/2004 Hinton
2004/0006488 A1 1/2004 Fitall et al.
2004/0010458 A1 1/2004 Friedman
2004/0010698 A1 1/2004 Rolfe
2004/0015714 A1 1/2004 Abraham et al.
2004/0015715 A1 1/2004 Brown
2004/0019549 A1 1/2004 Gulbrandsen
2004/0019799 A1 1/2004 Vering et al.
2004/0024671 A1 2/2004 Freund
2004/0024709 A1 2/2004 Yu et al.
2004/0030649 A1 2/2004 Nelson et al.
2004/0039586 A1 2/2004 Garvey et al.
2004/0044628 A1 3/2004 Mathew et al.
2004/0044673 A1 3/2004 Brady et al.
2004/0044739 A1 3/2004 Ziegler
2004/0078324 A1 4/2004 Lonnberg et al.
2004/0083159 A1 4/2004 Crosby et al.
2004/0088237 A1 5/2004 Moenickheim et al.
2004/0088255 A1 5/2004 Zielke et al.
2004/0107250 A1 6/2004 Marciano
2004/0110119 A1 6/2004 Riconda et al.
2004/0111359 A1 6/2004 Hudock
2004/0111375 A1 6/2004 Johnson
2004/0117302 A1 6/2004 Weichert et al.
2004/0122681 A1 6/2004 Ruvolo et al.
2004/0122696 A1 6/2004 Beringer
2004/0128150 A1 7/2004 Lundegren
2004/0128156 A1 7/2004 Beringer et al.
2004/0133440 A1 7/2004 Carolan et al.
2004/0133509 A1 7/2004 McCoy et al.
2004/0133513 A1 7/2004 McCoy et al.
2004/0133515 A1 7/2004 McCoy et al.
2004/0138994 A1 7/2004 DeFrancesco et al.
2004/0141005 A1 7/2004 Banatwala et al.
2004/0143546 A1 7/2004 Wood et al.
2004/0143596 A1 7/2004 Sirkin
2004/0153521 A1 8/2004 Kogo
2004/0158523 A1 8/2004 Dort
2004/0158723 A1 8/2004 Root
2004/0159700 A1 8/2004 Khan et al.
2004/0167793 A1 8/2004 Masuoka et al.
2004/0193891 A1 9/2004 Ollila
2004/0199789 A1 10/2004 Shaw et al.
2004/0210661 A1 10/2004 Thompson
2004/0220865 A1 11/2004 Lozowski et al.
2004/0220918 A1 11/2004 Scriffignano et al.
2004/0225643 A1 11/2004 Alpha et al.
2004/0230527 A1 11/2004 Hansen et al.
2004/0243514 A1 12/2004 Wankmueller
2004/0243518 A1 12/2004 Clifton et al.
2004/0243588 A1 12/2004 Tanner et al.
2004/0243832 A1 12/2004 Wilf et al.
2004/0249811 A1 12/2004 Shostack
2004/0250085 A1 12/2004 Tattan et al.
2004/0250107 A1 12/2004 Guo
2004/0254935 A1 12/2004 Chagoly et al.
2004/0255127 A1 12/2004 Arnouse
2004/0267714 A1 12/2004 Frid et al.
2005/0005168 A1 1/2005 Dick
2005/0010513 A1 1/2005 Duckworth et al.
2005/0021476 A1 1/2005 Candella et al.
2005/0021551 A1 1/2005 Silva et al.
2005/0027983 A1 2/2005 Klawon
2005/0027995 A1 2/2005 Menschik et al.
2005/0055231 A1 3/2005 Lee
2005/0058262 A1 3/2005 Timmins et al.
2005/0060332 A1 3/2005 Bernstein et al.
2005/0071328 A1 3/2005 Lawrence
2005/0075985 A1 4/2005 Cartmell
2005/0086126 A1 4/2005 Patterson
2005/0091164 A1 4/2005 Varble
2005/0097017 A1 5/2005 Hanratty
2005/0097039 A1 5/2005 Kulcsar et al.
2005/0097320 A1 5/2005 Golan et al.
2005/0102180 A1 5/2005 Gailey et al.
2005/0105719 A1 5/2005 Huda
2005/0108396 A1 5/2005 Bittner
2005/0108631 A1 5/2005 Amorin et al.
2005/0114335 A1 5/2005 Wesinger, Jr. et al.
2005/0114344 A1 5/2005 Wesinger, Jr. et al.
2005/0114345 A1 5/2005 Wesinger, Jr. et al.
2005/0119978 A1 6/2005 Ates
2005/0125291 A1 6/2005 Demkiw Grayson et al.
2005/0125397 A1 6/2005 Gross et al.
2005/0125686 A1 6/2005 Brandt
2005/0137899 A1 6/2005 Davies et al.
2005/0138391 A1 6/2005 Mandalia et al.
2005/0144133 A1* 6/2005 Hoffman ................ G06Q 20/02 705/50
2005/0144452 A1 6/2005 Lynch et al.
2005/0154664 A1 7/2005 Guy et al.
2005/0154665 A1 7/2005 Kerr
2005/0154769 A1 7/2005 Eckart et al.
2005/0166262 A1 7/2005 Beattie et al.
2005/0171884 A1 8/2005 Arnott
2005/0181765 A1 8/2005 Mark
2005/0204041 A1 9/2005 Blinn et al.
2005/0208461 A1 9/2005 Krebs et al.
2005/0216434 A1 9/2005 Haveliwala et al.
2005/0216582 A1 9/2005 Toomey et al.
2005/0216953 A1 9/2005 Ellingson
2005/0216955 A1 9/2005 Wilkins et al.
2005/0226224 A1 10/2005 Lee et al.
2005/0240578 A1 10/2005 Biederman et al.
2005/0256809 A1 11/2005 Sadri
2005/0267840 A1 12/2005 Holm-Blagg et al.
2005/0273431 A1 12/2005 Abel et al.
2005/0288998 A1 12/2005 Verma et al.
2006/0004623 A1 1/2006 Jasti
2006/0004626 A1 1/2006 Holmen et al.
2006/0010072 A1 1/2006 Eisen
2006/0010391 A1 1/2006 Uemura et al.
2006/0010487 A1 1/2006 Fierer et al.
2006/0016107 A1 1/2006 Davis
2006/0032909 A1 2/2006 Seegar
2006/0036543 A1 2/2006 Blagg et al.
2006/0036748 A1 2/2006 Nusbaum et al.
2006/0036870 A1 2/2006 Dasari et al.
2006/0041464 A1 2/2006 Powers et al.
2006/0041670 A1 2/2006 Musseleck et al.
2006/0059110 A1 3/2006 Madhok et al.

(56) References Cited

U.S. PATENT DOCUMENTS

2006/0059362 A1 3/2006 Paden et al.
2006/0069635 A1 3/2006 Ram et al.
2006/0074986 A1 4/2006 Mallalieu et al.
2006/0074991 A1 4/2006 Lussier et al.
2006/0079211 A1 4/2006 Degraeve
2006/0080230 A1 4/2006 Freiberg
2006/0080251 A1 4/2006 Fried et al.
2006/0080263 A1 4/2006 Willis et al.
2006/0085361 A1 4/2006 Hoerle et al.
2006/0101508 A1 5/2006 Taylor
2006/0129419 A1 6/2006 Flaxer et al.
2006/0129481 A1 6/2006 Bhatt et al.
2006/0129533 A1 6/2006 Purvis
2006/0131390 A1 6/2006 Kim
2006/0136595 A1 6/2006 Satyavolu
2006/0140460 A1 6/2006 Coutts
2006/0155573 A1 7/2006 Hartunian
2006/0155780 A1 7/2006 Sakairi et al.
2006/0161435 A1 7/2006 Atef et al.
2006/0161554 A1 7/2006 Lucovsky et al.
2006/0173776 A1 8/2006 Shalley et al.
2006/0173792 A1 8/2006 Glass
2006/0178971 A1 8/2006 Owen et al.
2006/0179050 A1 8/2006 Giang et al.
2006/0184585 A1 8/2006 Grear et al.
2006/0195351 A1 8/2006 Bayburtian
2006/0204051 A1 9/2006 Holland
2006/0212407 A1 9/2006 Lyon
2006/0218407 A1 9/2006 Toms
2006/0229943 A1 10/2006 Mathias et al.
2006/0229961 A1 10/2006 Lyftogt et al.
2006/0235935 A1 10/2006 Ng
2006/0239512 A1 10/2006 Petrillo
2006/0253358 A1 11/2006 Delgrosso et al.
2006/0262929 A1 11/2006 Vatanen et al.
2006/0265243 A1 11/2006 Racho et al.
2006/0271456 A1 11/2006 Romain et al.
2006/0271457 A1 11/2006 Romain et al.
2006/0271633 A1 11/2006 Adler
2006/0277089 A1 12/2006 Hubbard et al.
2006/0282429 A1 12/2006 Hernandez-Sherrington et al.
2006/0282660 A1 12/2006 Varghese et al.
2006/0282819 A1 12/2006 Graham et al.
2006/0287764 A1 12/2006 Kraft
2006/0287765 A1 12/2006 Kraft
2006/0287766 A1 12/2006 Kraft
2006/0287767 A1 12/2006 Kraft
2006/0288090 A1 12/2006 Kraft
2006/0294199 A1 12/2006 Bertholf
2007/0005508 A1 1/2007 Chiang
2007/0005984 A1 1/2007 Florencio et al.
2007/0022141 A1 1/2007 Singleton et al.
2007/0027816 A1 2/2007 Writer
2007/0032240 A1 2/2007 Finnegan et al.
2007/0038568 A1 2/2007 Greene et al.
2007/0043577 A1 2/2007 Kasower
2007/0047714 A1 3/2007 Baniak et al.
2007/0067297 A1 3/2007 Kublickis
2007/0072190 A1 3/2007 Aggarwal
2007/0073889 A1 3/2007 Morris
2007/0078908 A1 4/2007 Rohatgi et al.
2007/0078985 A1 4/2007 Shao et al.
2007/0083460 A1 4/2007 Bachenheimer
2007/0083463 A1 4/2007 Kraft
2007/0093234 A1 4/2007 Willis et al.
2007/0094230 A1 4/2007 Subramaniam et al.
2007/0094241 A1 4/2007 M. Blackwell et al.
2007/0112667 A1 5/2007 Rucker
2007/0112668 A1 5/2007 Celano et al.
2007/0121843 A1 5/2007 Atazky et al.
2007/0124256 A1 5/2007 Crooks et al.
2007/0143825 A1 6/2007 Goffin
2007/0156692 A1 7/2007 Rosewarne
2007/0162307 A1 7/2007 Austin et al.
2007/0174186 A1 7/2007 Hokland
2007/0174448 A1 7/2007 Ahuja et al.
2007/0174903 A1 7/2007 Greff
2007/0192121 A1 8/2007 Routson et al.
2007/0192853 A1 8/2007 Shraim et al.
2007/0198432 A1 8/2007 Pitroda et al.
2007/0204338 A1 8/2007 Aiello et al.
2007/0205266 A1 9/2007 Carr et al.
2007/0226122 A1 9/2007 Burrell et al.
2007/0240206 A1 10/2007 Wu et al.
2007/0244807 A1 10/2007 Andringa et al.
2007/0245245 A1 10/2007 Blue et al.
2007/0250441 A1 10/2007 Paulsen et al.
2007/0250459 A1 10/2007 Schwarz et al.
2007/0261108 A1 11/2007 Lee et al.
2007/0261114 A1 11/2007 Pomerantsev
2007/0266439 A1 11/2007 Kraft
2007/0282743 A1 12/2007 Lovelett
2007/0282959 A1* 12/2007 Stern .................... G06Q 30/02
709/206
2007/0288355 A1 12/2007 Roland et al.
2007/0288360 A1 12/2007 Seeklus
2007/0294195 A1 12/2007 Curry et al.
2008/0010203 A1 1/2008 Grant
2008/0010206 A1 1/2008 Coleman
2008/0010687 A1 1/2008 Gonen et al.
2008/0028446 A1 1/2008 Burgoyne
2008/0033742 A1 2/2008 Bernasconi
2008/0033956 A1 2/2008 Saha et al.
2008/0040610 A1 2/2008 Fergusson
2008/0047017 A1 2/2008 Renaud
2008/0052182 A1 2/2008 Marshall
2008/0052244 A1 2/2008 Tsuei et al.
2008/0059364 A1 3/2008 Tidwell et al.
2008/0066188 A1 3/2008 Kwak
2008/0072316 A1 3/2008 Chang et al.
2008/0077526 A1 3/2008 Arumugam
2008/0082536 A1 4/2008 Schwabe et al.
2008/0083021 A1 4/2008 Doane et al.
2008/0086431 A1 4/2008 Robinson et al.
2008/0091530 A1 4/2008 Egnatios et al.
2008/0103800 A1 5/2008 Domenikos et al.
2008/0103972 A1 5/2008 Lane
2008/0104672 A1 5/2008 Lunde et al.
2008/0109422 A1 5/2008 Dedhia
2008/0109875 A1 5/2008 Kraft
2008/0114670 A1 5/2008 Friesen
2008/0115191 A1 5/2008 Kim et al.
2008/0115226 A1 5/2008 Welingkar et al.
2008/0120569 A1 5/2008 Mann et al.
2008/0120716 A1 5/2008 Hall et al.
2008/0126233 A1 5/2008 Hogan
2008/0141346 A1 6/2008 Kay et al.
2008/0148368 A1 6/2008 Zurko et al.
2008/0154758 A1 6/2008 Schattmaier et al.
2008/0155686 A1 6/2008 McNair
2008/0162317 A1 7/2008 Banaugh et al.
2008/0162350 A1 7/2008 Allen-Rouman et al.
2008/0162383 A1 7/2008 Kraft
2008/0175360 A1 7/2008 Schwarz et al.
2008/0183480 A1 7/2008 Carlson et al.
2008/0183585 A1 7/2008 Vianello
2008/0195548 A1 8/2008 Chu et al.
2008/0201401 A1 8/2008 Pugh et al.
2008/0205655 A1 8/2008 Wilkins et al.
2008/0208726 A1 8/2008 Tsantes et al.
2008/0208735 A1 8/2008 Balet et al.
2008/0208752 A1 8/2008 Gottlieb et al.
2008/0208873 A1 8/2008 Boehmer
2008/0212845 A1 9/2008 Lund
2008/0216156 A1 9/2008 Kosaka
2008/0222706 A1 9/2008 Renaud et al.
2008/0222722 A1 9/2008 Navratil et al.
2008/0229415 A1 9/2008 Kapoor et al.
2008/0249869 A1 10/2008 Angell et al.
2008/0255992 A1 10/2008 Lin
2008/0256613 A1 10/2008 Grover
2008/0263058 A1 10/2008 Peden
2008/0270295 A1 10/2008 Lent et al.
2008/0270299 A1 10/2008 Peng

(56) References Cited

U.S. PATENT DOCUMENTS

2008/0281737 A1 11/2008 Fajardo
2008/0288283 A1 11/2008 Baldwin, Jr. et al.
2008/0288299 A1 11/2008 Schultz
2008/0301016 A1 12/2008 Durvasula et al.
2008/0306750 A1 12/2008 Wunder et al.
2008/0314977 A1 12/2008 Domenica et al.
2008/0319889 A1 12/2008 Hammad
2009/0006230 A1 1/2009 Lyda et al.
2009/0018986 A1 1/2009 Alcorn et al.
2009/0031426 A1 1/2009 Dal Lago et al.
2009/0037332 A1 2/2009 Cheung et al.
2009/0043691 A1 2/2009 Kasower
2009/0055322 A1 2/2009 Bykov et al.
2009/0055894 A1 2/2009 Lorsch
2009/0064297 A1 3/2009 Selgas et al.
2009/0094237 A1 4/2009 Churi et al.
2009/0094674 A1 4/2009 Schwartz et al.
2009/0100047 A1 4/2009 Jones et al.
2009/0106141 A1 4/2009 Becker
2009/0106150 A1 4/2009 Pelegero et al.
2009/0106846 A1 4/2009 Dupray et al.
2009/0119299 A1 5/2009 Rhodes
2009/0125369 A1 5/2009 Kloostra et al.
2009/0125972 A1 5/2009 Hinton et al.
2009/0132347 A1 5/2009 Anderson et al.
2009/0138335 A1 5/2009 Lieberman
2009/0144166 A1 6/2009 Dickelman
2009/0150166 A1 6/2009 Leite et al.
2009/0150238 A1 6/2009 Marsh et al.
2009/0157564 A1 6/2009 Cross
2009/0157693 A1 6/2009 Palahnuk
2009/0158030 A1 6/2009 Rasti
2009/0164232 A1 6/2009 Chmielewski et al.
2009/0164380 A1 6/2009 Brown
2009/0172788 A1 7/2009 Veldula et al.
2009/0172795 A1 7/2009 Ritari et al.
2009/0177529 A1 7/2009 Hadi
2009/0177562 A1 7/2009 Peace et al.
2009/0183259 A1 7/2009 Rinek et al.
2009/0199264 A1 8/2009 Lang
2009/0199294 A1 8/2009 Schneider
2009/0204514 A1 8/2009 Bhogal et al.
2009/0204599 A1 8/2009 Morris et al.
2009/0210241 A1 8/2009 Calloway
2009/0210807 A1 8/2009 Xiao et al.
2009/0215431 A1 8/2009 Koraichi
2009/0216640 A1 8/2009 Masi
2009/0222449 A1 9/2009 Hom et al.
2009/0228918 A1 9/2009 Rolff et al.
2009/0234665 A1 9/2009 Conkel
2009/0234775 A1 9/2009 Whitney et al.
2009/0234876 A1 9/2009 Schigel et al.
2009/0240624 A1 9/2009 James et al.
2009/0247122 A1 10/2009 Fitzgerald et al.
2009/0254375 A1 10/2009 Martinez et al.
2009/0254476 A1 10/2009 Sharma et al.
2009/0254572 A1 10/2009 Redlich et al.
2009/0254656 A1 10/2009 Vignisson et al.
2009/0254971 A1 10/2009 Herz et al.
2009/0260064 A1 10/2009 Mcdowell et al.
2009/0271847 A1 10/2009 Karjala et al.
2009/0307778 A1 12/2009 Mardikar
2009/0313134 A1 12/2009 Faith et al.
2009/0313562 A1 12/2009 Appleyard et al.
2009/0319638 A1 12/2009 Faith et al.
2009/0327270 A1 12/2009 Teevan et al.
2009/0328173 A1 12/2009 Jakobson et al.
2010/0011428 A1 1/2010 Atwood et al.
2010/0030578 A1 2/2010 Siddique et al.
2010/0030677 A1 2/2010 Melik-Aslanian et al.
2010/0042542 A1 2/2010 Rose et al.
2010/0043055 A1 2/2010 Baumgart
2010/0049803 A1 2/2010 Ogilvie et al.
2010/0058404 A1 3/2010 Rouse
2010/0063942 A1 3/2010 Arnott et al.
2010/0063993 A1 3/2010 Higgins et al.
2010/0076836 A1 3/2010 Giordano et al.
2010/0077351 A1 3/2010 Kaulgud et al.
2010/0077483 A1 3/2010 Stolfo et al.
2010/0083371 A1 4/2010 Bennetts et al.
2010/0088233 A1 4/2010 Tattan et al.
2010/0094768 A1 4/2010 Miltonberger
2010/0094910 A1 4/2010 Bayliss
2010/0100945 A1 4/2010 Ozzie et al.
2010/0114744 A1 5/2010 Gonen
2010/0114776 A1 5/2010 Weller et al.
2010/0121767 A1 5/2010 Coulter et al.
2010/0122305 A1 5/2010 Moloney
2010/0122324 A1 5/2010 Welingkar et al.
2010/0122333 A1 5/2010 Noe et al.
2010/0130172 A1 5/2010 Vendrow et al.
2010/0136956 A1 6/2010 Drachev et al.
2010/0138298 A1 6/2010 Fitzherald et al.
2010/0145836 A1 6/2010 Baker et al.
2010/0153278 A1 6/2010 Farsedakis
2010/0153290 A1 6/2010 Duggan
2010/0161816 A1 6/2010 Kraft et al.
2010/0169159 A1 7/2010 Rose et al.
2010/0174638 A1 7/2010 Debie et al.
2010/0174813 A1 7/2010 Hildreth et al.
2010/0175119 A1 7/2010 Vitaletti
2010/0179906 A1 7/2010 Hawkes
2010/0185546 A1 7/2010 Pollard
2010/0205076 A1 8/2010 Parson et al.
2010/0205662 A1 8/2010 Ibrahim et al.
2010/0211445 A1 8/2010 Bodington
2010/0211636 A1 8/2010 Starkenburg et al.
2010/0212004 A1 8/2010 Fu
2010/0217837 A1 8/2010 Ansari et al.
2010/0217969 A1 8/2010 Tomkow
2010/0223192 A1 9/2010 Levine et al.
2010/0229245 A1 9/2010 Singhal
2010/0241493 A1 9/2010 Onischuk
2010/0241535 A1 9/2010 Nightengale et al.
2010/0250338 A1 9/2010 Banerjee et al.
2010/0250410 A1 9/2010 Song et al.
2010/0250411 A1 9/2010 Rodski
2010/0250955 A1 9/2010 Trevithick et al.
2010/0257102 A1 10/2010 Perlman
2010/0258623 A1 10/2010 Beemer et al.
2010/0262932 A1 10/2010 Pan
2010/0280914 A1 11/2010 Carlson
2010/0281020 A1 11/2010 Drubner
2010/0293049 A1 11/2010 Maher et al.
2010/0293050 A1 11/2010 Maher et al.
2010/0293058 A1 11/2010 Maher et al.
2010/0293090 A1 11/2010 Domenikos et al.
2010/0299262 A1 11/2010 Handler
2010/0325442 A1 12/2010 Petrone et al.
2010/0325694 A1 12/2010 Bhagavatula et al.
2010/0332393 A1 12/2010 Weller et al.
2011/0004498 A1 1/2011 Readshaw
2011/0016533 A1 1/2011 Zeigler et al.
2011/0023115 A1 1/2011 Wright
2011/0029388 A1 2/2011 Kendall et al.
2011/0040736 A1 2/2011 Kalaboukis
2011/0071950 A1 3/2011 Ivanovic
2011/0082768 A1 4/2011 Eisen
2011/0083181 A1 4/2011 Nazarov
2011/0113084 A1 5/2011 Ramnani
2011/0119155 A1 5/2011 Hammad et al.
2011/0126024 A1 5/2011 Beatson et al.
2011/0126275 A1 5/2011 Anderson et al.
2011/0131096 A1 6/2011 Frew et al.
2011/0131123 A1 6/2011 Griffin et al.
2011/0137760 A1 6/2011 Rudie et al.
2011/0142213 A1 6/2011 Baniak et al.
2011/0145899 A1 6/2011 Cao et al.
2011/0148625 A1 6/2011 Velusamy
2011/0161218 A1 6/2011 Swift
2011/0166988 A1 7/2011 Coulter
2011/0167011 A1 7/2011 Paltenghe et al.
2011/0173681 A1 7/2011 Qureshi et al.
2011/0179139 A1 7/2011 Starkenburg et al.

(56) References Cited

U.S. PATENT DOCUMENTS

2011/0184780 A1 7/2011 Alderson et al.
2011/0184838 A1 7/2011 Winters et al.
2011/0196791 A1 8/2011 Dominguez
2011/0208601 A1 8/2011 Ferguson et al.
2011/0211445 A1 9/2011 Chen
2011/0260832 A1 10/2011 Ross et al.
2011/0264566 A1 10/2011 Brown
2011/0270754 A1 11/2011 Kelly et al.
2011/0307397 A1 12/2011 Benmbarek
2011/0307957 A1 12/2011 Barcelo et al.
2012/0011158 A1 1/2012 Avner et al.
2012/0016948 A1 1/2012 Sinha
2012/0018506 A1 1/2012 Hammad et al.
2012/0030216 A1 2/2012 Churi et al.
2012/0030771 A1 2/2012 Pierson et al.
2012/0047219 A1 2/2012 Feng et al.
2012/0047423 A1 2/2012 Tomkow
2012/0054592 A1 3/2012 Jaffe et al.
2012/0072382 A1 3/2012 Pearson et al.
2012/0079585 A1 3/2012 Chan et al.
2012/0084866 A1 4/2012 Stolfo
2012/0089438 A1 4/2012 Tavares et al.
2012/0108274 A1 5/2012 Acebo Ruiz et al.
2012/0110467 A1 5/2012 Blake et al.
2012/0110677 A1 5/2012 Abendroth et al.
2012/0117629 A1 5/2012 Miyazawa et al.
2012/0124498 A1 5/2012 Santoro et al.
2012/0130898 A1 5/2012 Snyder et al.
2012/0136763 A1 5/2012 Megdal et al.
2012/0151045 A1 6/2012 Anakata et al.
2012/0173339 A1 7/2012 Flynt et al.
2012/0173563 A1 7/2012 Griffin et al.
2012/0191610 A1 7/2012 Prasad
2012/0215682 A1 8/2012 Lent et al.
2012/0215719 A1 8/2012 Verlander
2012/0216125 A1 8/2012 Pierce
2012/0235897 A1 9/2012 Hirota
2012/0239497 A1 9/2012 Nuzzi
2012/0246060 A1 9/2012 Conyack, Jr. et al.
2012/0246730 A1 9/2012 Raad
2012/0253852 A1 10/2012 Pourfallah et al.
2012/0290660 A1 11/2012 Rao et al.
2012/0297484 A1 11/2012 Srivastava
2012/0323717 A1 12/2012 Kirsch
2012/0331557 A1 12/2012 Washington
2013/0004033 A1 1/2013 Trugenberger et al.
2013/0006843 A1 1/2013 Tralvex
2013/0018811 A1 1/2013 Britti et al.
2013/0031109 A1 1/2013 Roulson et al.
2013/0031624 A1 1/2013 Britti et al.
2013/0041701 A1 2/2013 Roth
2013/0066775 A1 3/2013 Milam
2013/0080467 A1 3/2013 Carson et al.
2013/0085804 A1 4/2013 Left et al.
2013/0085939 A1 4/2013 Colak et al.
2013/0086186 A1 4/2013 Tomkow
2013/0086654 A1 4/2013 Tomkow
2013/0110678 A1 5/2013 Vigier et al.
2013/0117087 A1 5/2013 Coppinger
2013/0117387 A1 5/2013 Tomkow
2013/0125010 A1 5/2013 Strandell
2013/0132151 A1 5/2013 Stibel et al.
2013/0139229 A1 5/2013 Fried et al.
2013/0173449 A1 7/2013 Ng et al.
2013/0179955 A1 7/2013 Bekker et al.
2013/0198525 A1 8/2013 Spies et al.
2013/0205135 A1 8/2013 Lutz
2013/0212661 A1 8/2013 Neafsey et al.
2013/0246150 A1 9/2013 Ovick et al.
2013/0246273 A1 9/2013 Ovick et al.
2013/0246528 A1 9/2013 Ogura
2013/0254008 A1 9/2013 Ovick et al.
2013/0254096 A1 9/2013 Serio et al.
2013/0268333 A1 10/2013 Ovick et al.
2013/0271272 A1 10/2013 Dhesi et al.
2013/0275762 A1 10/2013 Tomkow
2013/0279676 A1 10/2013 Baniak et al.
2013/0282461 A1 10/2013 Ovick et al.
2013/0290097 A1 10/2013 Balestrieri et al.
2013/0293363 A1 11/2013 Plymouth
2013/0298238 A1 11/2013 Shah et al.
2013/0318569 A1 11/2013 Canning et al.
2013/0332342 A1 12/2013 Kasower
2013/0339217 A1 12/2013 Breslow et al.
2013/0339249 A1 12/2013 Weller et al.
2013/0346331 A1* 12/2013 Giovannetti ............ G06F 16/27 705/320
2014/0012733 A1 1/2014 Vidal
2014/0013396 A1 1/2014 Field-Eliot et al.
2014/0025475 A1 1/2014 Burke
2014/0032723 A1 1/2014 Nema
2014/0033280 A1 1/2014 Nimashakavi et al.
2014/0040051 A1 2/2014 Ovick et al.
2014/0040135 A1 2/2014 Ovick et al.
2014/0046872 A1 2/2014 Arnott et al.
2014/0051464 A1 2/2014 Ryan et al.
2014/0061302 A1 3/2014 Hammad
2014/0089167 A1 3/2014 Kasower
2014/0110477 A1 4/2014 Hammad
2014/0162611 A1 6/2014 Mezhibovsky et al.
2014/0164112 A1 6/2014 Kala
2014/0164398 A1 6/2014 Smith et al.
2014/0164519 A1 6/2014 Shah
2014/0201100 A1 7/2014 Rellas et al.
2014/0258083 A1 9/2014 Achanta et al.
2014/0279467 A1 9/2014 Chapa et al.
2014/0280945 A1 9/2014 Lunt
2014/0283123 A1 9/2014 Lonstein et al.
2014/0289812 A1 9/2014 Wang et al.
2014/0298485 A1 10/2014 Gardner
2014/0317023 A1 10/2014 Kim
2014/0317716 A1 10/2014 Chao et al.
2014/0331282 A1 11/2014 Tkachev
2014/0379600 A1 12/2014 Chapa et al.
2015/0067341 A1* 3/2015 Deen ..................... H04L 63/123 713/176
2015/0089569 A1 3/2015 Sondhi et al.
2015/0142595 A1 5/2015 Acuña-Rohter
2015/0180870 A1 6/2015 Zhang et al.
2015/0199667 A1 7/2015 Fernando et al.
2015/0199668 A1 7/2015 Fernando et al.
2015/0249655 A1 9/2015 Lunt
2015/0254658 A1* 9/2015 Bondesen ............ G06Q 20/227 705/44
2015/0326580 A1 11/2015 McMillan et al.
2015/0350186 A1 12/2015 Chan et al.
2016/0005020 A1 1/2016 Fernando et al.
2016/0027008 A1 1/2016 John
2016/0050198 A1 2/2016 Thibadeau, Sr. et al.
2016/0065563 A1 3/2016 Broadbent et al.
2016/0088465 A1 3/2016 Golla
2016/0142532 A1 5/2016 Bostick
2016/0226879 A1 8/2016 Chan et al.
2016/0275476 A1 9/2016 Artman et al.
2016/0283740 A1 9/2016 Roundtree
2016/0337369 A1 11/2016 Sanso
2017/0061436 A1 3/2017 Liu et al.
2017/0186012 A1 6/2017 McNeal
2017/0200223 A1 7/2017 Kasower
2017/0324749 A1 11/2017 Bhargava et al.
2017/0331832 A1 11/2017 Lander et al.
2017/0337549 A1 11/2017 Wong
2017/0337557 A1 11/2017 Durney et al.
2017/0357971 A1 12/2017 Pitz et al.
2018/0041336 A1 2/2018 Keshava et al.
2018/0046856 A1 2/2018 Kapczynski
2018/0077142 A1 3/2018 Thakkar
2018/0083915 A1 3/2018 Medam et al.
2018/0101890 A1 4/2018 Eisen
2018/0227292 A1 8/2018 Golshan et al.
2018/0232433 A1 8/2018 Kanvinde
2018/0285549 A1 10/2018 Sonkar et al.
2018/0337914 A1 11/2018 Mohamad Abdul et al.
2018/0343265 A1 11/2018 McMillan et al.

(56) References Cited

U.S. PATENT DOCUMENTS

2018/0365690 A1 12/2018 Ovick et al.
2018/0375791 A1 12/2018 Kaladgi et al.
2019/0073676 A1 3/2019 Wang
2019/0095516 A1 3/2019 Srinivasan et al.
2019/0164173 A1 5/2019 Liu et al.
2019/0228173 A1 7/2019 Gupta et al.
2019/0228178 A1 7/2019 Sharma et al.
2019/0259030 A1 8/2019 Burger
2019/0349360 A1 11/2019 Yeddula et al.
2019/0394041 A1 12/2019 Jain et al.
2020/0007316 A1 1/2020 Krishnamacharya et al.
2020/0104834 A1 4/2020 Pontious et al.
2020/0137080 A1 4/2020 Bloomquist et al.
2020/0160472 A1 5/2020 Kapczynski
2020/0162443 A1 5/2020 Poschel et al.
2020/0205002 A1 6/2020 Talwar
2020/0228321 A1 7/2020 Krishnamacharya et al.
2020/0293684 A1 9/2020 Harris et al.
2020/0304501 A1 9/2020 Fan
2020/0314088 A1 10/2020 Feijoo et al.
2020/0320511 A1 10/2020 Anderson et al.
2020/0334349 A1 10/2020 Billman et al.
2020/0342557 A1 10/2020 Chapa et al.
2020/0372535 A1 11/2020 Walz et al.
2020/0380112 A1 12/2020 Allen
2020/0380509 A1 12/2020 Billman et al.
2020/0394331 A1 12/2020 Talwar
2020/0403992 A1 12/2020 Huffman et al.
2021/0012312 A1 1/2021 Bradstreet
2021/0117969 A1 4/2021 Chilaka et al.
2021/0144131 A1 5/2021 Krishnamacharya
2021/0203667 A1 7/2021 Bondugula et al.
2021/0240808 A1 8/2021 sadhwani et al.
2021/0241120 A1 8/2021 Chen et al.
2021/0273805 A1 9/2021 Jain et al.
2021/0282018 A1 9/2021 Talwar et al.
2021/0288948 A1 9/2021 Joffe et al.
2022/0027853 A1 1/2022 McMillan et al.
2022/0027891 A1 1/2022 Anderson et al.
2022/0044343 A1 2/2022 Chapa et al.
2022/0070169 A1 3/2022 Cano et al.
2022/0109578 A1 4/2022 Kirsch

FOREIGN PATENT DOCUMENTS

CA 3 052 415 7/2021
CA 2 896 503 8/2021
CN 104877993 9/2015
EP 1 028 401 8/2000
EP 1 239 378 9/2002
EP 1 301 887 4/2003
EP 1 850 278 10/2007
EP 2 425 583 3/2012
EP 2 074 513 2/2016
EP 2 939 364 6/2020
EP 3 577 850 7/2021
EP 3 862 897 8/2021
ES 2 811 070 3/2021
GB 2 518 099 3/2015
IN 201917040928 11/2019
JP 2005-135431 5/2005
JP 2005-208945 8/2005
JP 4202314 12/2008
JP 2012-113696 6/2012
KR 10-2000-0063313 11/2000
KR 10-2002-0039203 5/2002
KR 10-2007-0081504 8/2007
TW 1256569 6/2006
WO WO 99/054803 10/1999
WO WO 99/060481 11/1999
WO WO 00/030045 5/2000
WO WO 01/009752 2/2001
WO WO 01/009792 2/2001
WO WO 01/010090 2/2001
WO WO 01/084281 11/2001
WO WO 02/011025 2/2002
WO WO 02/029636 4/2002
WO WO 03/073711 9/2003
WO WO 2004/031986 4/2004
WO WO 2004/049654 6/2004
WO WO 2005/033979 4/2005
WO WO 2006/019752 2/2006
WO WO 2006/050278 5/2006
WO WO 2006/069199 6/2006
WO WO 2006/099081 9/2006
WO WO 2007/001394 1/2007
WO WO 2007/050156 5/2007
WO WO 2008/042614 4/2008
WO WO 2008/054849 5/2008
WO WO 2009/064694 5/2009
WO WO 2009/102391 8/2009
WO WO 2009/108901 9/2009
WO WO 2009/117468 9/2009
WO WO 2010/001406 1/2010
WO WO 2010/062537 6/2010
WO WO 2010/077989 7/2010
WO WO 2010/150251 12/2010
WO WO 2011/005876 1/2011
WO WO 2011/014878 2/2011
WO WO 2012/054646 4/2012
WO WO 2013/126281 8/2013
WO WO 2013/140410 9/2013
WO WO 2014/008079 1/2014
WO WO 2014/150987 9/2014
WO WO 2015/038520 3/2015
WO WO 2018/129373 7/2018
WO WO 2018/191638 10/2018
WO WO 2018/199992 11/2018
WO WO 2019/006144 1/2019
WO WO 2019/152592 8/2019
WO WO 2019/209857 10/2019
WO WO 2019/245998 12/2019
WO WO 2020/206305 10/2020
WO WO 2021/011308 1/2021
WO WO 2021/067446 4/2021
WO WO 2021/097090 5/2021
WO WO 2021/138263 7/2021
WO WO 2021/155053 8/2021

OTHER PUBLICATIONS

U.S. Appl. No. 14/565,020, U.S. Pat. No. 10,373,240, Systems, Methods and Computer-Program Products for Eligibility Verification, filed Dec. 9, 2014.

U.S. Appl. No. 16/447763, U.S. Pat. No. 11,074,641, Systems, Methods and Computer-Program Products for Eligibility Verification, filed Jun. 20, 2019.

U.S. Appl. No. 12/705,489, filed Feb. 12, 2010, Bargoli et al.

U.S. Appl. No. 12/705,511, filed Feb. 12, 2010, Bargoli et al.

Actuate, "Delivering Enterprise Information for Corporate Portals", White Paper, 2004, pp. 1-7.

"Aggregate and Analyze Social Media Content: Gain Faster and Broader Insight to Market Sentiment," SAP Partner, Mantis Technology Group, Apr. 2011, pp. 4.

Aharony et al., "Social Area Networks: Data Networking of the People, by the People, for the People," 2009 International Conference on Computational Science and Engineering, May 2009, pp. 1148-1155.

Aktas et al., "Personalizing PageRank Based on Domain Profiles", WEBKDD workshop: Webmining and Web Usage Analysis, Aug. 22, 2004, pp. 83-90.

Aktas et al., "Using Hyperlink Features to Personalize Web Search", WEBKDD workshop: Webmining and Web Usage Analysis, Aug. 2004.

"Arizona Company Has Found Key in Stopping ID Theft," PR Newswire, New York, Aug. 10, 2005 http://proquest.umi.com/pqdweb?did=880104711&SID=1&Fmt=3&clientId-19649&RQT=309&Vname=PQD.

ABC News Now:Money Matters, as broadcasted Nov. 15, 2005 with guest Todd Davis (CEO of Lifelock), pp. 6.

(56) References Cited

OTHER PUBLICATIONS

Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Bacon, Chris, "OAuth id_token missing information on refresh #1141", <https://github.com/googleapis/google-api-dotnet-client/issues/1141>, Jan. 1, 2018, pp. 9.
Bielski, Lauren, "Will you Spend to Thwart ID Theft?" ABA Banking Journal, Apr. 2005, pp. 54, 56-57, 60.
Bluecava, "What We Do", http://www.bluecava.com/what-we-do/, printed Nov. 5, 2012 in 3 pages.
Buxfer, http://www.buxfer.com/ printed Feb. 5, 2014 in 1 page.
Check, http://check.me/ printed Feb. 5, 2014 in 3 pages.
Cheng, Fred, "Security Attack Safe Mobile and Cloud-based One-time Password Tokens Using Rubbing Encryption Algorithm", MONET, 2011, vol. 16, pp. 304-336.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
Cullen, Terri; "The Wall Street Journal Complete Identity Theft Guidebook:How to Protect Yourself from the Most Pervasive Crime in America"; Chapters, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
Day, Jo and Kevin; "ID-ology: A Planner's Guide to Identity Theft"; Journal of Financial Planning:Tech Talk; pp. 36-38; Sep. 2004.
Equifax, "InstaTouch ID: Separate Fact from Friction." http://equifax.uberflip.eom/i/791148-mobile-consumer-identity-service-product-sheet/1,2016, pp. 2.
Equifax; "Equifax Credit Watch"; https://www.econsumer.equifax.co.uk/consumer/uk/sitepage.ehtml, dated Jun. 27, 2007 on www.archive.org.
Ettorre, "Paul Kahn on Exceptional Marketing," Management Review, vol. 83, No. 11, Nov. 1994, pp. 48-51.
Facebook, "Facebook helps you connect and share with the people in your life," www.facebook.com printed Nov. 16, 2010 in 1 page.
Familysecure.com, "Frequently Asked Questions", http://www.familysecure.com/FAQ.aspx as archived Jul. 15, 2007 in 3 pages.
FamilySecure.com; "Identity Theft Protection for the Whole Family FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
Fisher, Joseph, "Access to Fair Credit Reports: Current Practices and Proposed Legislation," American Business Law Journal, Fall 1981, vol. 19, No. 3, p. 319.
Franks et al., "HTTP Authentication: Basic and Digest Access Authentication", Network Working Group, Standards Track, Jun. 1999, pp. 34.
"Fraud Alert | Learn How". Fight Identity Theft, http://www.fightidentitytheft.com/flag.html, accessed on Nov. 5, 2009.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gordon et al., "Identity Fraud: A Critical National and Global Threat," LexisNexis, Oct. 28, 2003, pp. 1-48.
Gordon et al., "Using Identity Authentication and Eligibility Assessment to Mitigate the Risk of Improper Payments", LexisNexis, Jan. 28, 2008, pp. 18. https://risk.lexisnexis.eom/-/media/files/government/white-paper/identity_authentication-pdf.pdf.
Harrington et al., "iOS 4 in Action", Chapter 17, Local and Push Notification Services, Manning Publications Co., Jun. 2011, pp. 347-353.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did-852869731&SID=1&Fmt=3&clientld-19649&RQT=309&Vname=PQD.
IDEON, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Jones et al., "JSON Web Signature (JWS)", Internet Engineering Task Force (IETF), ISSN: 2070-1721, Standards Track, May 2015, pp. 59.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lee, W.A.; "Experian, on Deal Hunt, Nets Identity Theft Insurer", American Banker: The Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.

(56) References Cited

OTHER PUBLICATIONS

Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, Jan. 9, 2007, pp. 49.
Lobo, Jude, "MySAP.com Enterprise Portal Cookbook," SAP Technical Delivery, Feb. 2002, vol. 1, pp. 1-13.
Lodderstedt et al., "OAuth 2.0 token Revocation", Internet Engineering Task Force (IETF), Standards Track, Aug. 2013, pp. 11.
Magid, Lawrence, J., Business Tools: When Selecting an ASP Ensure Data Mobility , Los Angeles Times, Los Angeles, CA, Feb. 26, 2001, vol. C, Issue 4, pp. 3.
Manilla, http://www.manilla.com/how-it-works/ printed Feb. 5, 2014 in 1 page.
Meyers et al., "Using Your Social Networking Accounts To Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321,2007, pp. 195-230.
Microsoft, "Expand the Reach of Your Business," Microsoft Business Solutions, 2004, in 16 pages.
Mint.com, http://www.mint.com/how-it-works/ printed Feb. 5, 2013 in 2 pages.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
"Name Availability Records", Westlaw Database Directory, http://directory.westlaw.com/scope/default.asp?db=NA-ALL&RS=W...&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/printed Nov. 5, 2012 in 5 Pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
Personalcapital.com, http://www.personalcapital.com/how-it-works printed Feb. 5, 2014 in 5 pages.
Phinisee, Tamarind, "Banks, FTC Step Up Efforts to Address Identity Theft", San Antonio Business Journal; San Antonio, Jul. 5, 2002, vol. 16, No. 24, pp. 5.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Roth, Andrew, "CheckFree to Introduce E-Mail Billing Serving," American Banker, New York, Mar. 13, 2001, vol. 166, No. 49, pp. 3.
Sakimura et al., "OpenID Connect Core 1.0 Incorporating Errata Set 1", <https://openid.net/specs/openid-connect-core-1_0.html>, Nov. 8, 2014, pp.
SAS, "SAS® Information Delivery Portal", Fact Sheet, 2008, in 4 pages.
Scholastic Inc.:Parent's Request for Information http://web.archive.org/web/20070210091055/http://www.scholastic.com/inforequest/index.htm as archived Feb. 10, 2007 in 1 page.
Scholastic Inc.Privacy Policy http://web.archive.org/web/20070127214753/http://www.scholastic.com/privacy.htm as archived Jan. 27, 2007 in 3 pages.
Securities and Futures Commission, "Guideline on Anti-Money Laundering and Counter-Terrorist Financing", Jul. 2012, pp. 135.
Singletary, Michelle, "The Littlest Victims of ID Theft", The Washington Post, The Color of Money, Oct. 4, 2007.
Sun, Hung-Min, "An Efficient Remote Use Authentication Scheme Using Smart Cards", IEEE Transactions on Consumer Electronics, Nov. 2000, vol. 46, No. 4, pp. 958-961.
Target, "Free Credit Monitoring and Identity Theft Protection with Experian's ProtectMyID Now Available", Jan. 13, 2014, pp. 2. http://corporate.target.com.
Themorningcall.Com, "Cheap Ways to Foil Identity Theft," www.mcall.com/business/columnists/all-karp.5920748jul01,0 . . . , published Jul. 1, 2007.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.

(56) References Cited

OTHER PUBLICATIONS

Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "Howto Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wang et al., "User Identification Based on Finger-vein Patterns for Consumer Electronics Devices", IEEE Transactions on Consumer Electronics, May 2010, vol. 56, No. 2, pp. 799-804.
Weaver et al., "Federated, Secure Trust Networks for Distributed Healthcare IT Services", IEEE International Conference on Industrial Informatics, 2003. INDIN 2003. Proceedings, 2003, pp. 162-169.
Whatls.com, "Risk-Based Authentication (RBA)", https://web.archive.org/web/20121025033106/http://whatis.techtarget.com/definition/risk-based-authentication-RBA, Oct. 23, 2012, pp. 1.
Yahoo! Search, "People Search," http://people.yahoo/com printed Nov. 16, 2010 in 1 page.
YODLEE | Money Center, https://yodleemoneycenter.com/ printed Feb. 5, 2014 in 2 pages.
You Need A Budget, http://www.youneedabudget.com/features printed Feb. 5, 2014 in 3 pages.
Official Communication in Australian Patent Application No. 2014318966, dated Apr. 6, 2019.
Official Communication in Australian Patent Application No. 2019261724, dated Sep. 1, 2020.
Official Communication in Canadian Patent Application No. 2,923,697, dated Oct. 9, 2019.
Extended European Search Report for Application No. EP14843372.5, dated May 2, 2017.
Official Communication in European Application No. EP14843372.5 dated Nov. 29, 2018.
Extended European Search Report for Application No. EP19203040.1, dated Jan. 29, 2020.
International Search Report and Written Opinion for Application No. PCT/US2014/054713, dated Dec. 15, 2014.
International Preliminary Report on Patentability in Application No. PCT/US2014/054713, dated Mar. 24, 2016.
Official Communication in Australian Patent Application No. 2006306790, dated Apr. 29, 2010.
Official Communication in Australian Patent Application No. 2006306790, dated May 19, 2011.
International Search Report and Written Opinion for Application No. PCT/US2006/028006, dated Jul. 27, 2007.
International Preliminary Report on Patentability in Application No. PCT/US2006/028006, dated Apr. 23, 2008.
International Search Report and Written Opinion for Application No. PCT/US2019/037547, dated Oct. 4, 2019.
International Preliminary Report on Patentability in Application No. PCT/US2019/037547, dated Dec. 30, 2020.
International Search Report and Written Opinion for Application No. PCT/US2021/015566, dated May 11, 2021.
Aad et al., "NRC Data Collection and the Privacy by Design Principles", IEEE, Nov. 2010, pp. 5.
Haglund, Christoffer, "Two-Factor Authentication with a Mobile Phone", Fox Technologies, Uppsala, Department of Information Technology, Nov. 2, 2007, pp. 62.
Extended European Search Report for Application No. EP21183630.9, dated Oct. 15, 2021.
Willems et al., "On the Security and Privacy of Interac e-Transfers", School of Electrical Engineering and Computer Science, Faculty of Engineering, University of Ottawa, Extended Version, Dec. 10, 2019, pp. 47.
International Preliminary Report on Patentability in Application No. PCT/US2021/015566, dated Aug. 11, 2022.

* cited by examiner

SYSTEMS AND METHODS FOR ELIGIBILITY VERIFICATION

CROSS-REFERENCE TO RELATED APPLICATIONS

This patent application is a continuation of U.S. patent application Ser. No. 16/447,763, filed Jun. 20, 2019, which is a continuation of U.S. patent application Ser. No. 14/565,020, filed Dec. 9, 2014, now U.S. Pat. No. 10,373,240, issued Aug. 6, 2019, and claims the benefit of U.S. Provisional Patent Application No. 61/984,351, filed Apr. 25, 2014, which are all hereby expressly incorporated by reference herein in their entirety and for all purposes. In addition, any and all applications for which a priority claim is identified in the application data sheet as filed with the present application are also expressly incorporated by reference.

BACKGROUND

Technical Field

The present disclosure relates generally to computer processing and more particularly, but not by way of limitation, to eligibility verification systems and methods for on-demand products.

History Of Related Art

Numerous computer systems exist that provide on-demand products to consumers. For purposes of this patent application, an on-demand product is a product that is requested by a requestor such as a consumer and is intended by a provider to be delivered in real-time or in near real-time. On-demand products are generally requested electronically over a communications network such as, for example, public or private intranets, a public switched telephone network (PSTN), a cellular network, the Internet, or the like. Examples of on-demand products include content such as, for example, text, graphics, photos, video, audio, code, software applications, documents, access to cloud applications, and the like. On-demand products can also include content streaming, for example, of video, audio, and the like. By way of further example, on-demand products may include services such as, for example, identity-monitoring services.

In general, on demand products are not, inter alia, physically shipped or delivered. Rather, on demand products are typically delivered electronically over a communications network or by initiating a requested service. Oftentimes, however, it can be difficult to provide and determine eligibility for on-demand products efficiently and securely.

SUMMARY OF THE INVENTION

In one embodiment, a method includes receiving, from a requestor, a request for an on-demand product. The method further includes determining an eligibility token format applicable to the request, wherein the eligibility token format comprises a plurality of partial segments of identifying information. The method also includes prompting the requestor to provide a plurality of partial-segment values corresponding to the plurality of partial segments. In addition, the method includes receiving the plurality of partial-segment values in response to the prompting. Moreover, the method includes generating an eligibility token from the plurality of partial-segment values. The method also includes determining the requestor's eligibility for the on-demand product based, at least in part, on a lookup of the eligibility token in an eligibility token repository. The eligibility token repository includes a plurality of eligibility tokens of the eligibility token format.

In one embodiment, a system includes at least one processor. The at least one processor is operable to perform a method. The method further includes determining an eligibility token format applicable to the request, wherein the eligibility token format comprises a plurality of partial segments of identifying information. The method also includes prompting the requestor to provide a plurality of partial-segment values corresponding to the plurality of partial segments. In addition, the method includes receiving the plurality of partial-segment values in response to the prompting. Moreover, the method includes generating an eligibility token from the plurality of partial-segment values. The method also includes determining the requestor's eligibility for the on-demand product based, at least in part, on a lookup of the eligibility token in an eligibility token repository. The eligibility token repository includes a plurality of eligibility tokens of the eligibility token format.

In one embodiment, a computer-program product includes a non-transitory computer-usable medium having computer-readable program code embodied therein. The computer-readable program code adapted to be executed to implement a method. The method further includes determining an eligibility token format applicable to the request, wherein the eligibility token format comprises a plurality of partial segments of identifying information. The method also includes prompting the requestor to provide a plurality of partial-segment values corresponding to the plurality of partial segments. In addition, the method includes receiving the plurality of partial-segment values in response to the prompting. Moreover, the method includes generating an eligibility token from the plurality of partial-segment values. The method also includes determining the requestor's eligibility for the on-demand product based, at least in part, on a lookup of the eligibility token in an eligibility token repository. The eligibility token repository includes a plurality of eligibility tokens of the eligibility token format.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
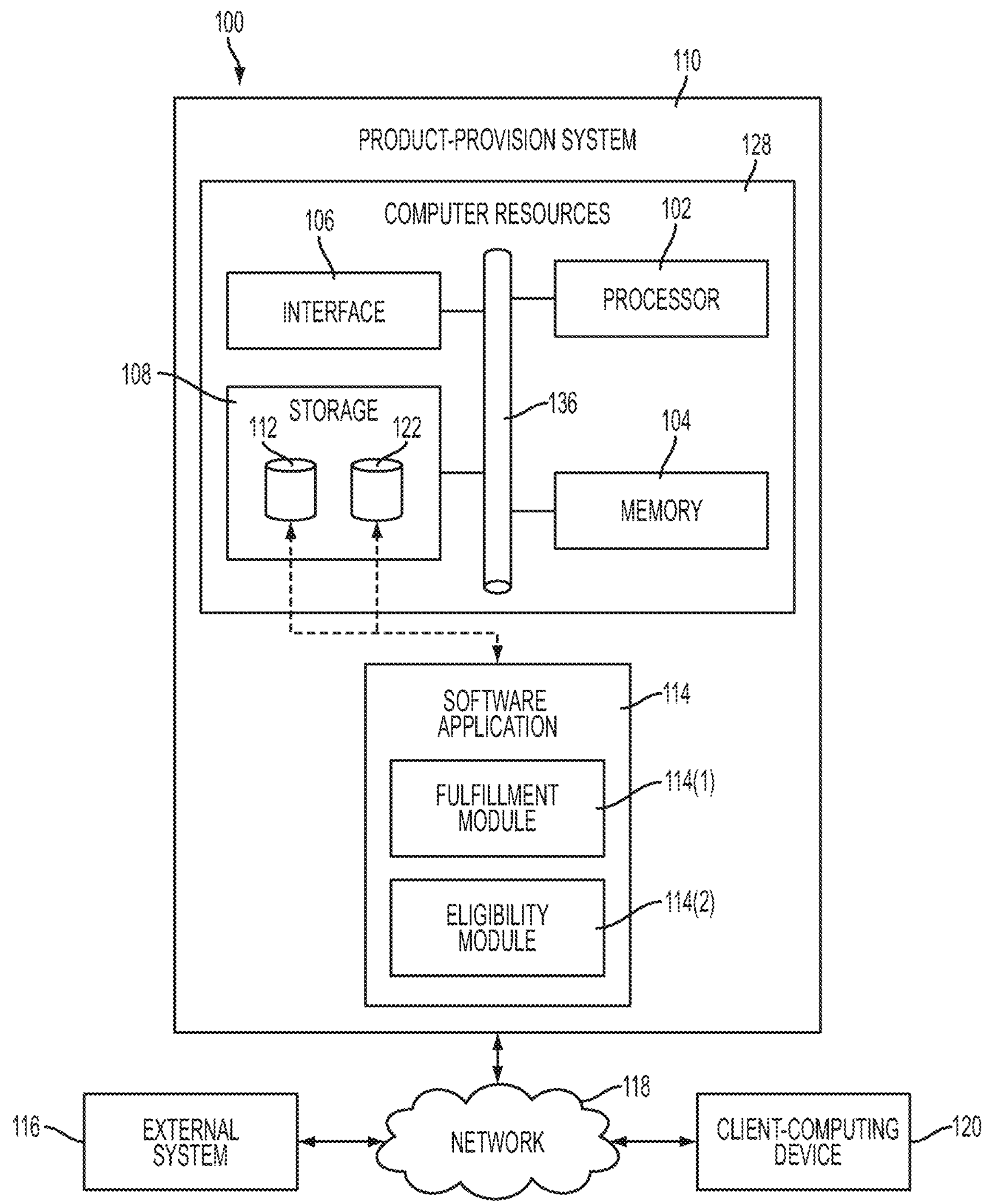
FIG. 1 illustrates an example of a system that can be used to dynamically determine eligibility for an on-demand product.

In various embodiments, on-demand products can be provided by a computer system over a network. For purposes of this patent application, providing or delivering an on-demand product refers to automated actions by a computer system to fulfill a request for the on-demand product. For example, for various types of on-demand products, providing or delivering the on-demand products can include transmitting, streaming, or initializing the on-consumers for transmission or streaming thereto.

One example of an on-demand product is an on-demand identity product. An on-demand identity product, as used herein, is an on-demand product as defined above that may be used to facilitate discovery or prevention of identity theft. Identity theft generally involves a use of personally identifying information (PII) that is not authorized by an owner of the PII and can include, for example, an unauthorized change to PII or an unauthorized use of PII to access resources or to obtain credit or other benefits. PII, as used herein, refers to information that can be used to uniquely identify, contact, or locate an individual person or can be used with other sources to uniquely identify, contact, or locate an individual person. PII may include, but is not limited to, social security numbers (SSNs), bank or credit card account numbers, passwords, birth dates, and addresses.

Identity products can include, for example, credit products. For purposes of this patent application, a credit product is an on-demand identity product as defined above that pertains to receiving, acquiring, reporting on, monitoring, or otherwise acting upon information related to consumer credit files. On-demand identity products that are not credit products may be referenced herein as non-credit products. Non-credit products can include monitoring and/or reporting services relating, for example, to exchanges of PII over the Internet, aliases associated with social-security numbers, sex-offender registries, payday loans, changes of address, and the like.

Oftentimes, a third party, or sponsor, may want to offer an on-demand product to a selected group of beneficiaries such as, for example, all or a subset of its customers. In various cases, the sponsor may partially or fully subsidize the on-demand product. The sponsored offer may be a reward to certain customers, a marketing promotion, a response to an unfavorable customer experience, combinations of same, and/or the like. In a more specific example, a retail outlet may be subject to a data breach that potentially exposes vast amounts of sensitive data relating to its customers. The sensitive data can include any data not intended for public dissemination such as, for example, data considered classified, confidential, personal, and/or the like. In such a case, the retail outlet may desire to provide an on-demand identity product, such as identity or credit monitoring, to a set of affected customers.

Various technical problems can arise when implementing sponsored offers for on-demand products. As an example, a provider of the on-demand product, who is often completely distinct from the sponsor, generally needs data or information sufficient to identify who is eligible. Although the sponsor may maintain data sufficient to identify a set of eligible beneficiaries, the provider typically does not.

One way to address the above-described problem is for either the sponsor or the provider to issue a code (e.g., a personal identification number) to each beneficiary. The codes can be shared between the provider and the sponsor. The beneficiaries can then enter the codes via a website associated with the provider. In certain embodiments, a disadvantage of this approach is that it does not scale well. For example, if there are millions of potential beneficiaries, as may be the case in the data breach example described above, millions of codes generally need to be generated and distributed. Sometimes, such codes must be distributed by mail due to limited contact information available to the sponsor, which can be expensive in time and money. Electronic distribution (e.g., email) can also be a substantial burden when significant numbers of beneficiaries are involved.

When there are a significant number of beneficiaries, another way to address the above-described problem is to omit eligibility verification. For instance, continuing the above example of the retail outlet that is subject to the data breach, the retail outlet can choose to make credit or identity monitoring available to the public at large. While this approach can remove any need to distribute codes, it also typically results in a much greater expense to the sponsor as a result of a potentially much greater class of beneficiaries than is necessary.

The present disclosure describes examples of determining eligibility for on-demand products using eligibility tokens. In certain embodiments, when a sponsor desires to offer an on-demand product to a group of beneficiaries, an eligibility token format can be configured based on information available to the sponsor about the group of beneficiaries. In various cases, the eligibility token format can define a composition of identifying information such as, for example, PII, that uniquely identifies beneficiaries.

Advantageously, in certain embodiments, the eligibility token format can include a plurality of partial segments of identifying information such as, for example, a last four digits of a SSN, a first three digits of an address field, etc. In various embodiments, the eligibility token format can be used as a basis to dynamically generate eligibility tokens for requestors of on-demand products. In certain embodiments, the eligibility tokens can be used to automatically determine whether the requestors are eligible beneficiaries of a sponsored offer for the on-demand product.

FIG. 1 illustrates an example of a system 100 that can be used to dynamically determine eligibility for an on-demand product. The system 100 includes a product-provision system 110, one or more external systems 116, and one or more client-computing devices 120. The product-provision system 110 is operable to communicate with the one or more external systems 116 and the one or more client-computing devices 120 over a network 118.

The product-provision system 110 includes a software application 114 operable to execute on computer resources 128. In particular embodiments, the product-provision system 110 may perform one or more steps or blocks of one or more methods described or illustrated herein. In particular embodiments, one or more computer systems may provide functionality described or illustrated herein. In particular embodiments, encoded software running on one or more computer systems may perform one or more steps or blocks of one or more methods described or illustrated herein or provide functionality described or illustrated herein.

The components of the product-provision system 110 may comprise any suitable physical form, configuration, number, type and/or layout. As an example, and not by way of limitation, the product-provision system 110 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the product-provision system 110 may include one or more computer systems; be unitary or distributed;

span multiple locations; span multiple machines; or reside in a cloud, which may include one or more cloud components in one or more networks.

In the depicted embodiment, the product-provision system 110 includes a processor 102, memory 104, storage 108, interface 106, and bus 136. Although a particular product-provision system is depicted having a particular number of particular components in a particular arrangement, this disclosure contemplates any suitable product-provision system having any suitable number of any suitable components in any suitable arrangement.

Processor 102 may be a microprocessor, controller, or any other suitable computing device, resource, or combination of hardware, software and/or encoded logic operable to execute, either alone or in conjunction with other components, (e.g., memory 104), the software application 114. Such functionality may include providing various features discussed herein. In particular embodiments, processor 102 may include hardware for executing instructions, such as those making up the software application 114. As an example and not by way of limitation, to execute instructions, processor 102 may retrieve (or fetch) instructions from an internal register, an internal cache, memory 104, or storage 108; decode and execute them; and then write one or more results to an internal register, an internal cache, memory 104, or storage 108.

In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 108 and the instruction caches may speed up retrieval of those instructions by processor 102. Data in the data caches may be copies of data in memory 104 or storage 108 for instructions executing at processor 102 to operate on; the results of previous instructions executed at processor 102 for access by subsequent instructions executing at processor 102, or for writing to memory 104, or storage 108; or other suitable data. The data caches may speed up read or write operations by processor 102. The TLBs may speed up virtual-address translations for processor 102. In particular embodiments, processor 102 may include one or more internal registers for data, instructions, or addresses. Depending on the embodiment, processor 102 may include any suitable number of any suitable internal registers, where appropriate. Where appropriate, processor 102 may include one or more arithmetic logic units (ALUs); be a multi-core processor; include one or more processors 102; or any other suitable processor.

Memory 104 may be any form of volatile or non-volatile memory including, without limitation, magnetic media, optical media, random access memory (RAM), read-only memory (ROM), flash memory, removable media, or any other suitable local or remote memory component or components. In particular embodiments, memory 104 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 104 may include one or more memories 104, where appropriate. Memory 104 may store any suitable data or information utilized by the product-provision system 110, including software embedded in a computer readable medium, and/or encoded logic incorporated in hardware or otherwise stored (e.g., firmware). In particular embodiments, memory 104 may include main memory for storing instructions for processor 102 to execute or data for processor 102 to operate on. In particular embodiments, one or more memory management units (MMUs) may reside between processor 102 and memory 104 and facilitate accesses to memory 104 requested by processor 102.

As an example and not by way of limitation, the product-provision system 110 may load instructions from storage 108 or another source (such as, for example, another computer system) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 may execute only instructions in one or more internal registers or internal caches or in memory 104 (as opposed to storage 108 or elsewhere) and may operate only on data in one or more internal registers or internal caches or in memory 104 (as opposed to storage 108 or elsewhere).

In particular embodiments, storage 108 may include mass storage for data or instructions. As an example and not by way of limitation, storage 108 may include a hard disk drive (HDD), a floppy disk drive, flash memory, an optical disc, a magneto-optical disc, magnetic tape, or a Universal Serial Bus (USB) drive or a combination of two or more of these. Storage 108 may include removable or non-removable (or fixed) media, where appropriate. Storage 108 may be internal or external to the product-provision system 110, where appropriate. In particular embodiments, storage 108 may be non-volatile, solid-state memory. In particular embodiments, storage 108 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 108 may take any suitable physical form and may comprise any suitable number or type of storage. Storage 108 may include one or more storage control units facilitating communication between processor 102 and storage 108, where appropriate.

In particular embodiments, interface 106 may include hardware, encoded software, or both providing one or more interfaces for communication (such as, for example, packet-based communication) among any networks, any network devices, and/or any other computer systems. As an example and not by way of limitation, communication interface 106 may include a network interface controller (NIC) or network adapter for communicating with an Ethernet or other wire-based network and/or a wireless NIC (WNIC) or wireless adapter for communicating with a wireless network.

Depending on the embodiment, interface 106 may be any type of interface suitable for any type of network for which product-provision system 110 is used. As an example and not by way of limitation, product-provision system 110 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, product-provision system 110 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The product-provision system 110 may include any suitable interface 106 for any one or more of these networks, where appropriate.

In some embodiments, interface 106 may include one or more interfaces for one or more I/O devices. One or more of these I/O devices may enable communication between a person and the product-provision system 110. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 106 for them. Where appropriate, interface 106 may include one or more drivers enabling processor 102 to drive one or more of these I/O devices. Interface 106 may include one or more interfaces 106, where appropriate.

Bus 136 may include any combination of hardware, software embedded in a computer readable medium, and/or encoded logic incorporated in hardware or otherwise stored (e.g., firmware) to couple components of the product-provision system 110 to each other. As an example and not by way of limitation, bus 136 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 136 may include any number, type, and/or configuration of buses 136, where appropriate. In particular embodiments, one or more buses 136 (which may each include an address bus and a data bus) may couple processor 102 to memory 104. Bus 136 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 102 (such as, for example, one or more internal registers or caches), one or more portions of memory 104, one or more portions of storage 108, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

In a typical embodiment, the product-provision system 110 is operable to provide on-demand products to eligible requestors of the on-demand products. The functionality of the product-provision system 110 can be facilitated by the software application 114. In certain embodiments, the software application 114 is operable to execute on the product-provision system 110 in the fashion described above. The software application 114 can include, for example, a fulfillment module 114(1) and an eligibility module 114(2).

In general, the fulfillment module 114(1) can logically encapsulate software that is operable to generate, acquire, and/or provide the on-demand products to requestors thereof. The on-demand products provisioned via the fulfillment module 114(1) may be selected from a number of categories such as, for example, text, graphics, photos, video, audio, code, software applications, documents, access to cloud applications, and the like. The on-demand products can also include content streaming, for example, of video, audio, and the like. By way of further example, on-demand products may include services such as, for example, monitoring services. Other examples of on-demand products will be apparent to one of ordinary skill in the art after reviewing the inventive principles contained herein.

The eligibility module 114(2) logically encapsulates software that determines eligibility for the on-demand products. The eligibility module 114(2) can maintain and access an eligibility token repository 112. In certain embodiments, the eligibility token repository 112 can include eligibility tokens that conform to a configurable eligibility token format. The eligibility token format can define a composition of segments of identifying information deemed to identify, and in some cases uniquely identify, eligible requestors of a particular on-demand product. In an example, the eligibility token format can include PII such as SSNs, bank or credit card account numbers, birth dates, addresses, combinations of same, and/or the like. In another example, the eligibility token can include business identifying information such as employer identification numbers, business addresses, combinations of same, and/or the like.

Advantageously, in certain embodiments, the eligibility token format can include a plurality partial segments, or portions, of identifying information. In an example, a particular eligibility token format could include portions, or substrings, of PII such as SSNs (e.g., last four digits), bank or credit card account numbers (e.g., first three digits), birth dates (e.g., a month portion of a birth date), addresses (e.g., a street-number portion of a home address), combinations of same, and/or the like. A particular eligibility token format can also include a combination of full and partial segments of identifying information.

In various cases, the eligibility token repository 112 can relate to a particular on-demand product, a particular sponsored offer for an on-demand product, combinations of same, and/or the like. In some embodiments, each eligibility token in the eligibility token repository 112 can include segment values corresponding to the segments defined by the eligibility token format. In certain embodiments, the product-provision system 110 can include more than one of the eligibility token repository 112. For example, the product-provision system 110 could maintain an eligibility token repository 112 for each sponsored offer it is configured to handle and/or for each on-demand product it is operable to provide. The eligibility token format implemented by the eligibility token repository 112 can be configured according to information available, for example, to a particular sponsor of an offer for a particular on-demand product.

As illustrated, the eligibility token repository 112 can be stored in the storage 108. The eligibility token repository 112 may be maintained, for example, in a database, flat file, and/or the like. In some cases, the eligibility token repository 112 can be stored or maintained in a data structure such as a hash table.

In a hash table implementation, the eligibility token repository 112 may map a plurality of keys to a plurality of values via a hash function. In an example, the keys can be the eligibility tokens. According to this example, each eligibility token can be computed as a hash of a set of segment values defined by the eligibility token format. Continuing this example, the values can be information about eligible requestors of the on-demand product such as, for example, information sufficient to retrieve additional information about the eligible requestor (e.g. a record ID). For example, in some embodiments, the values can be used to retrieve information from an enrollment repository 122. The enrollment repository 122 can include searchable data about eligible requestors. In certain embodiments, the enrollment repository 122 includes pre-existing information about the eligible requestors that is maintained by the sponsor in the ordinary course of business and which has been shared with the product-provision system 110.

Although the fulfillment module 114(1) and the eligibility module 114(2) are depicted as two separate software components, in various other embodiments, such software components are organized differently. For example, the fulfillment module 114(1) and the eligibility module 114(2) could be merged into a single software component, each be further divided into other software components, or have their collective functionality allocated differently among any number of software components. In addition, although the software application 114 is illustrated singly for illustrative purposes, it should be appreciated that any number of software applications may be utilized to achieve similar functionality.

The one or more client-computing devices 120 are computer systems used by requestors, for example, to request and/or receive the on-demand products. The one or more client-computing devices 120 can include, for example, desktop computers, laptop computers, tablet computers, smart phones, wearable or body-borne computers, and/or the like. The one or more external systems 116 are representative of computer systems from which the product-provision system 110 is operable to interact. For example, in various embodiments, the product-provision system may acquire particular on-demand products from the one or more external systems 116 or obtain information or data necessary to generate or determine eligibility for particular on-demand products. For example, the one or more external systems 116 may provide the information or data via an application programming interface (API).

In operation, the product-provision system 110 interacts with the one or more client-computing devices 120 to receive requests for on-demand products. Upon receipt of a request for an on-demand product, the product-provision system 110 can use the eligibility module 114(2) to determine a requestor's eligibility for the on-demand product. If the requestor is eligible for the on-demand product, the fulfillment module 114(1) can provide the requested on-demand product. Examples will be described with respect to FIGS. 3-4.

Each instance of a system such as, for example, the product-provision system 110 and the one or more external systems 116, may be representative of any combination of computing equipment including, for example, any number of physical or virtual server computers and any number and organization of databases. In addition, it should be appreciated that, in various embodiments, the network 118 can be viewed as an abstraction of multiple distinct networks via which the product-provision system 110 is operable to communicate. For example, the network 118 can include one or multiple communications networks such as, for example, public or private intranets, a public switched telephone network (PSTN), a cellular network, the Internet, or the like.

Figure 2:
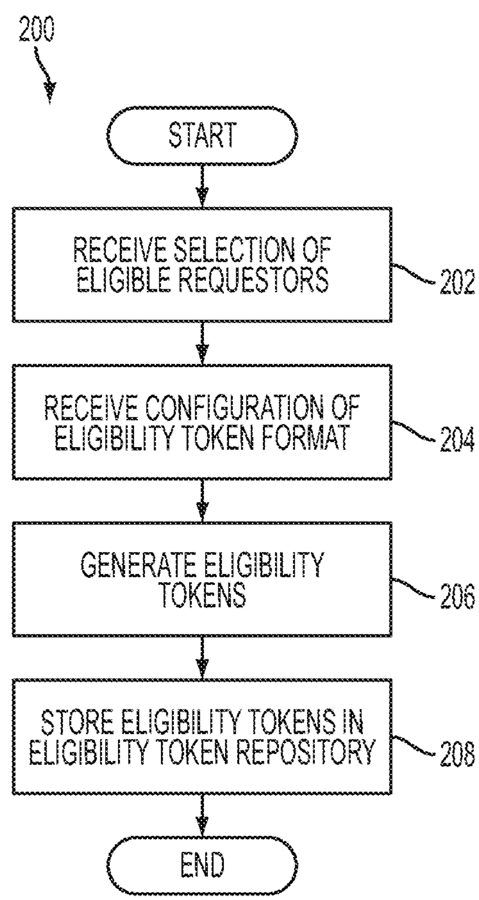
FIG. 2 illustrates an example of a process for establishing an eligibility token repository.

FIG. 2 illustrates an example of a process 200 for establishing an eligibility token repository. For example, the process 200, in whole or in part, can be implemented by one or more of the product-provision system 110, the software application 114, the fulfillment module 114(1), and/or the eligibility module 114(2). The process 200 can also be performed generally by the system 100. Although any number of systems, in whole or in part, can implement the process 200, to simplify discussion, the process 200 will be described in relation to specific systems or subsystems of the system 100.

At block 202, the eligibility module 114(2) receives a selection of eligible requestors. In an example, the eligible requestors can be intended beneficiaries of a sponsored offer for an on-demand product. The requestors can be selected by a user or administrator associated with a sponsor of the sponsored offer, a user or administrator of the provider acting according to instructions from the sponsor, combinations of same, and/or the like. In an example, the eligible requestors can be selected via receipt of the enrollment repository 122, receipt of information or data for storage in the enrollment repository, etc.

At block 204, the eligibility module 114(2) receives a configuration of an eligibility token format. In certain embodiments, the configuration can be a selection of full and/or partial segments of identifying information related to the eligible requestors. In various cases, the configuration can be received from an administrator or user associated with the provider and/or sponsor. In some embodiments, the configuration can identify a composition of columns of a database table in the enrollment repository 122. An example will be described with respect to FIG. 2.

At block 206, the eligibility module 114(2) generates eligibility tokens for the eligible requestors according to the eligibility token format. In some embodiments, each eligibility token can be a sequential concatenation of segment values according to the eligibility token format. In other embodiments, each eligibility token can be hash of the segment values.

At block 208, the eligibility module 114(2) stores the eligibility tokens in the eligibility token repository 112. In hash table implementations, the block 208 can include storing a key-value pair for each requestor such that the eligibility token is the key. In these implementations, each eligibility token can be mapped to information about a corresponding eligible requestor. The information can be, for example, a record identifier or other data sufficient to lookup the corresponding eligible requestor in the enrollment repository 122 and retrieve additional data.

Figure 3:
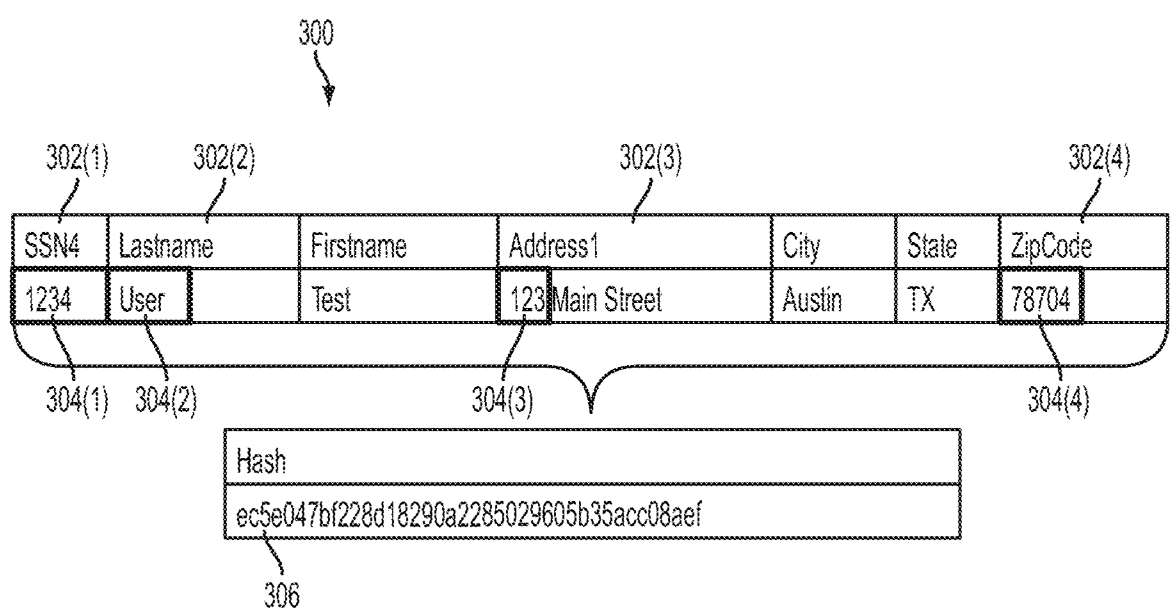
FIG. 3 illustrates an example of eligibility token generation.

FIG. 3 illustrates an example 300 of eligibility token generation. As illustrated, an example eligibility token format is shown to include a segment 302(1), a segment 302(2), a segment 302(3), and a segment 302(4) (collectively, segments 302). The segment 302(1) and the segment 302(3) are examples of partial segments of identifying information. In particular, the example 300 illustrates the segment 302(1) as including the last four digits of a SSN and illustrates the segment 302(3) as including a street-number portion of a home address. The segment 302(2) and the segment 302(4) are examples of full segments of identifying information.

The example 300 further shows segment values 304(1), 304(2), 304(3), and 304(4) (collectively, segment values 304). The segment values 304 correspond to the segments 302. As illustrated, an eligibility token 306 can be determined by computing a hash of the segment values 304.

Figure 4:
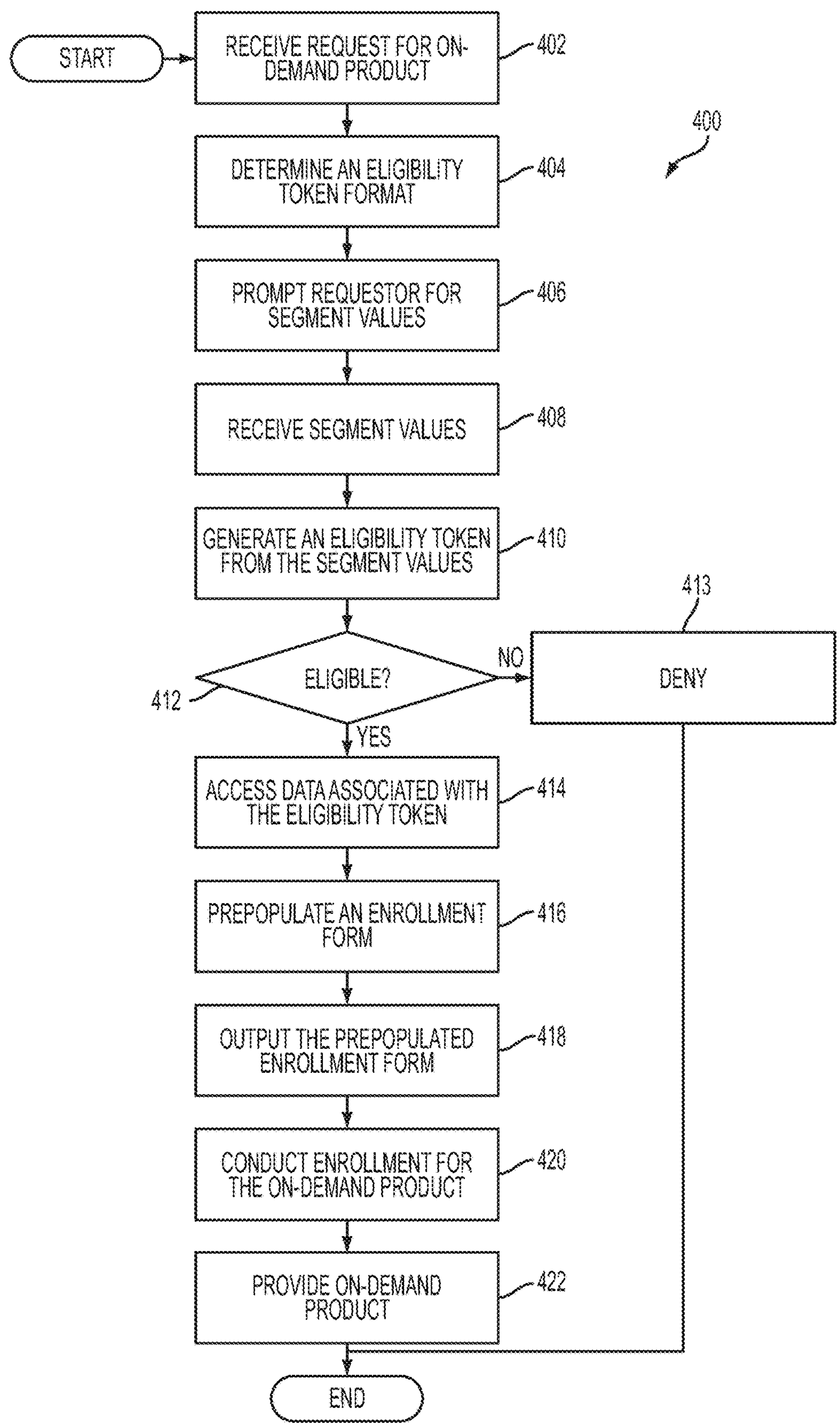
FIG. 4 illustrates an example of a process for determining requestor eligibility for an on-demand product.

FIG. 4 illustrates an example of a process 400 for determining requestor eligibility for an on-demand product. For example, the process 400, in whole or in part, can be implemented by one or more of the product-provision system 110, the software application 114, the fulfillment module 114(1), and/or the eligibility module 114(2). The process 400 can also be performed generally by the system 100. Although any number of systems, in whole or in part, can implement the process 400, to simplify discussion, the process 400 will be described in relation to specific systems or subsystems of the system 100.

At block 402, the fulfillment module 114(1) receives a request for an on-demand product. In various embodiments, the request can be received via a web interface of the product-provision system 110 that is accessed by the requestor. At block 404, the eligibility module 114(2) determines an eligibility token format applicable to the request. For example, based on the web interface or a web page accessed by the requestor, the eligibility module 114(2) may be able to determine a desired on-demand product, an applicable sponsored offer for the desired on-demand product, and/or the like. Based on this and/or other information, the eligibility module 114(2) may be able to identify the applicable eligibility token format.

At block 406, the eligibility module 114(2) prompts the requestor for segment values defined by the eligibility token format. For example, the eligibility module 114(2) can serve a web page containing fields for each of the segment values. At block 408, the eligibility module 114(2) receives the segment values. At block 410, the eligibility module 114(2) generates an eligibility token from the segment values. For example, in some embodiments, the eligibility token can be a hash of the segment values.

At decision block 412, the eligibility module 114(2) determines whether the requestor is eligible for the on-demand product. In certain embodiments, the requestor's eligibility can be determined based on a lookup of the eligibility token in the eligibility repository 112. In these embodiments, if the eligibility token is found in the eligibility token repository 112, the requestor may be deemed eligible. Otherwise, if the eligibility token is not found in the eligibility token repository 112, the requestor may be deemed ineligible. If it is determined at the decision block 412 that the requestor is not eligible for the on-demand product, the process 400 proceeds to block 413, where the requestor is denied access. After block 413, the process 400 ends. Otherwise, if the requestor is determined to be eligible for the on-demand product, the process 400 proceeds to block 414.

At block 414, the eligibility module 114(2) accesses data associated with the eligibility token. For example, in embodiments in which a hash table is utilized, the eligibility token can be used as a key to retrieve a value. In these embodiments, the value can be used to access the data from the enrollment repository 122 or another data source. The accessed data can include, for example, information used by the product-provision system 110 to enroll requestors for the on-demand product.

At block 416, the fulfillment module 114(1) prepopulates an enrollment form with at least a portion of the accessed data. For example, the fulfillment module 114(1) can select data from the enrollment repository 122 that is useful or required during enrollment for the on-demand product. It should be appreciated that a single enrollment form is described only for simplicity of explanation. In various cases, two or more enrollment forms used in a series or sequence may be prepopulated and used for the enrollment.

At block 418, the fulfillment module 114(1) outputs the enrollment form to the requestor. At block 420, the fulfillment module 114(1) conducts enrollment for the on-demand product. In an example, the enrollment can include any of the enrollment or registration functionality described in U.S. patent application Ser. No. 13/093,663 or U.S. Pat. No. 8,359,278. U.S. patent application Ser. No. 13/093,663 and U.S. Pat. No. 8,359,278 are hereby incorporated by reference. At block 422, the fulfillment module 114(1) provides the on-demand product to the requestor. After block 422, the process 400 ends.

Any suitable combination of various embodiments, or the features thereof, is contemplated. For example, any of the systems or devices disclosed herein can include features of other embodiments. As another example, any blocks or steps disclosed in a process described herein may be used in other processes described herein. Thus, a block of one of the processes described with respect to FIGS. 2-4 may be used in any of the processes described herein.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A computer-implemented method comprising:

receiving, from a first third party database, first user data for a first plurality of users, wherein the first user data comprises a first set of data fields of identifying information for each user of the first plurality of users;

based at least in part on a determination of a first format for generating a first eligibility token, generating first eligibility tokens for the first plurality of users based at least in part on the first format;

receiving, from a second third party database, second user data for a second plurality of users, wherein the second user data comprises a second set of data fields of identifying information for each user of the second plurality of users, wherein the second set of data fields includes at least one unique data field that is not included in first set of data fields;

based at least in part on a determination of a second format for generating a second eligibility token, generating second eligibility tokens for the second plurality of users based at least in part on the second format;

storing, in a token repository, the first eligibility tokens and the second eligibility tokens;

receiving, from a requestor device via a network interface, a request for an on-demand product which comprises an electronic identifier for a product to be delivered electronically to the requestor device, wherein the request includes personal information associated with a first user;

generating a first user eligibility token for the first user based at least in part on the personal information and one of the first format or the second format; and determining eligibility of the first user for accessing the on-demand product based at least in part on there being a matching eligibility token in the token repository for the first user eligibility token.

2. The computer-implemented method of claim 1, wherein the first eligibility tokens and the second eligibility tokens are stored, in the token repository, as key values.

3. The computer-implemented method of claim 2, wherein the first user eligibility token is associated with a key in a key-value pair for the first user and is mapped to at least a portion of the personal information associated with the first user.

4. The computer-implemented method of claim 1, wherein receiving the request for an on-demand product further comprises:

prompting the requestor device to provide encrypted data packets comprising the personal information associated with the first user; and receiving, from the requestor device via the network interface, the encrypted data packets comprising the personal information associated with the first user.

5. The computer-implemented method of claim 1, further comprising:

determining whether to apply the first format or the second format based at least in part on the request.

6. The computer-implemented method of claim 1, further comprising:

performing lookup of the first user eligibility token in the token repository to find a matching token.

7. The computer-implemented method of claim 1, wherein:

the determination of the first format includes:

a first selection format for identifying a first selection of a first plurality of segments of identifying information based at least in part on the first set of data fields available in the received first user data; and a first concatenation format for concatenating the first plurality of segments of identifying information into a first string of values, and the determination of the second format includes:

a second selection format for identifying a second selection of a second plurality of segments of identifying information based at least in part on the second set of data fields available in the received second user data and including the at least one unique data field; and a second concatenation format for concatenating the second plurality of segments of identifying information into a second string of values.

8. The computer-implemented method of claim 1, further comprising:

accessing data associated with the first user eligibility token;

prepopulating an enrollment form using at least a portion of the accessed data;

outputting the prepopulated enrollment form to the requestor device;

receiving enrollment authorization from the requestor device; and responsive to the enrollment authorization, enrolling the first user for the on-demand product.

9. The computer-implemented method of claim 8, further comprising initiating provision of the on-demand product to the requestor device.

10. The computer-implemented method of claim 1, wherein the first eligibility tokens compromise values generated by a hash function.

11. The computer-implemented method of claim 1, further comprising:

receiving indicators of on-demand products to be associated with the first plurality of users; and receiving indicators of on-demand products to be associated with the second plurality of users.

12. The computer-implemented method of claim 1, further comprising:

determining that the first user is not eligible for accessing the on-demand product based at least in part on there being no matching eligibility token in the token repository for the first user eligibility token; and based at least in part on the determination that the first user is not eligible for the on-demand product, denying provision of the on-demand product to the requestor device.

13. A system comprising:

a first third party database;

a second third party database;

a requestor device associated with a first user;

a token repository;

a network interface; and at least one processor, wherein the at least one processor is operable to perform a method comprising:

receiving, from the first third party database, first user data for a first plurality of users, wherein the first user data comprises a first set of data fields of identifying information for each user of the first plurality of users;

based at least in part on a determination of a first format for generating a first eligibility token, generating first eligibility tokens for the first plurality of users based at least in part on the first format;

receiving, from the second third party database, second user data for a second plurality of users, wherein the second user data comprises a second set of data fields of identifying information for each user of the second plurality of users, wherein the second set of data fields includes at least one unique data field that is not included in first set of data fields;

based at least in part on a determination of a second format for generating a second eligibility token, generating second eligibility tokens for the second plurality of users based at least in part on the second format;

storing, in the token repository, the first eligibility tokens and the second eligibility tokens;

receiving, from the requestor device via the network interface, a request for an on-demand product which comprises an electronic identifier for a product to be delivered electronically to the requestor device, wherein the request includes personal information associated with a first user;

generating a first user eligibility token for the first user based at least in part on the personal information and one of the first format or the second format; and determining eligibility of the first user for accessing the on-demand product based at least in part on there being a matching eligibility token in the token repository for the first user eligibility token.

14. The system of claim 13, wherein the first eligibility tokens and the second eligibility tokens are stored, in the token repository, as key values.

15. The system of claim 13, wherein receiving the request for an on-demand product further comprises:

prompting the requestor device to provide encrypted data packets comprising the personal information associated with the first user; and receiving, from the requestor device via the network interface, the encrypted data packets comprising the personal information associated with the first user.

16. The system of claim 13, wherein the method performed by the at least one processor is also operable to perform:

determining whether to apply the first format or the second format based at least in part on the request.

17. The system of claim 13, wherein the method performed by the at least one processor is also operable to perform:

performing lookup of the first user eligibility token in the token repository to find a matching token.

18. The system of claim 13, wherein:

the determination of the first format includes:

a first selection format for identifying a first selection of a first plurality of segments of identifying information based at least in part on the first set of data fields available in the received first user data; and a first concatenation format for concatenating the first plurality of segments of identifying information into a first string of values, and the determination of the second format includes:

a second selection format for identifying a second selection of a second plurality of segments of identifying information based at least in part on the second set of data fields available in the received second user data and including the at least one unique data field; and a second concatenation format for concatenating the second plurality of segments of identifying information into a second string of values.

19. The system of claim 13, wherein the method performed by the at least one processor is also operable to perform:

accessing data associated with the first user eligibility token;

prepopulating an enrollment form using at least a portion of the accessed data;

outputting the prepopulated enrollment form to the requestor device;

receiving enrollment authorization from the requestor device; and responsive to the enrollment authorization, enrolling the first user for the on-demand product.

20. The system of claim 13, wherein the method performed by the at least one processor is also operable to perform:

determining that the first user is not eligible for accessing the on-demand product based at least in part on there being no matching eligibility token in the token repository for the first user eligibility token; and based at least in part on the determination that the first user is not eligible for the on-demand product, denying provision of the on-demand product to the requestor device.

* * * * *